(12) United States Patent
Strassel et al.

(10) Patent No.: US 11,705,714 B2
(45) Date of Patent: Jul. 18, 2023

(54) HYBRID SWITCHING APPARATUS FOR ELECTRIC GRIDS

(71) Applicant: ABB Schweiz AG, Baden (CH)

(72) Inventors: Thorsten Strassel, Mülligen (CH); Antonello Antoniazzi, Milan (IT); Markus Abplanalp, Baden-Dättwil (CH); Thierry Delachaux, Zürich (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/549,208

(22) Filed: Dec. 13, 2021

(65) Prior Publication Data

US 2022/0190582 A1 Jun. 16, 2022

(30) Foreign Application Priority Data

Dec. 15, 2020 (EP) .................................... 20214064

(51) Int. Cl.
*H02H 3/02* (2006.01)
*H02H 7/22* (2006.01)
*H02H 9/02* (2006.01)

(52) U.S. Cl.
CPC .............. *H02H 3/025* (2013.01); *H02H 7/22* (2013.01); *H02H 9/02* (2013.01)

(58) Field of Classification Search
CPC ............ H02H 3/025; H02H 7/22; H02H 9/02; H01H 9/542; H01H 2009/546
(Continued)

(56) References Cited

U.S. PATENT DOCUMENTS 5,886,860 A * 3/1999 Chen ...................... H02H 9/026
361/45
2012/0243137 A1* 9/2012 Lawler ................. H01H 33/285
361/93.7
(Continued)

FOREIGN PATENT DOCUMENTS

CN 109904832 A * 6/2019
DE 102007042903 A1 1/2009
(Continued)

OTHER PUBLICATIONS

Machine Translation of Che et al. Chinese Patent Document CN 109904832 A Jun. 18, 2019 (Year: 2019).*
(Continued)

*Primary Examiner* — Kevin J Comber
(74) *Attorney, Agent, or Firm* — Leydig, Voit & Mayer, Ltd.

(57) ABSTRACT

A switching apparatus includes first and second electric terminals, and first and second electric branches comprising one or more switching devices. The second electric branch is electrically connected in parallel with said first electric branch between said first and second electric terminals. The switching apparatus comprises a current blocking circuit adapted to block a current along said second branch. The current blocking circuit includes a first switching device of solid-state type and a first electronic circuit electrically connected in parallel to said first switching device of solid-state type. The switching apparatus further comprises a current limiting circuit adapted to limit a current flowing along said second electric branch. Said current limiting circuit is electrically connected in series with said current blocking circuit and it includes a second switching device of solid-state type and a second electronic circuit electrically (Continued)

connected in parallel to said second switching device of solid-state type.

18 Claims, 17 Drawing Sheets

(58) Field of Classification Search
USPC .......................................................... 361/93.9
See application file for complete search history.

(56) References Cited

U.S. PATENT DOCUMENTS

2016/0105018 A1\* 4/2016 Wang ..................... H01H 9/541
 361/93.9
2017/0098931 A1\* 4/2017 Gerdinand ............. H02H 3/087

FOREIGN PATENT DOCUMENTS

| DE | 102017101451 A1 | 7/2018 |
| EP | 2801994 A1 | 11/2014 |
| EP | 3267460 A1 | 1/2018 |

OTHER PUBLICATIONS

European Patent Office, Extended European Search Report in European Patent Application No. 20214064.6, 5 pp. (dated Jun. 8, 2021).

\* cited by examiner

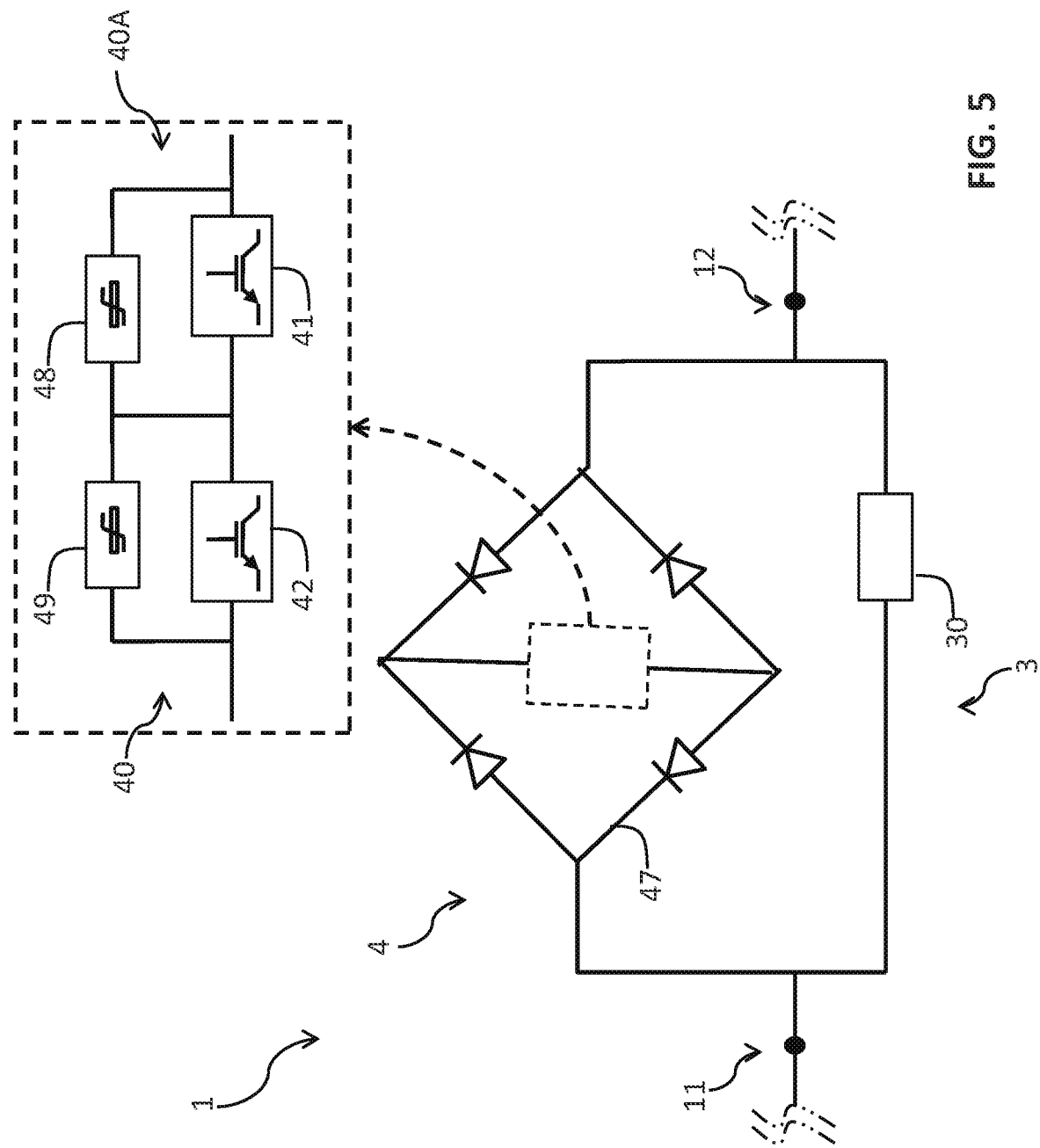

HYBRID SWITCHING APPARATUS FOR ELECTRIC GRIDS

CROSS-REFERENCE TO RELATED APPLICATIONS

This patent application claims priority to European Patent (EP) Application Ser. No. EP 20214064.6, filed on Dec. 15, 2020, which is incorporated herein by reference in its entirety for all purposes.

FIELD OF THE DISCLOSURE

The present invention relates to the field of electric grids. More particularly, the present disclosure relates to a hybrid switching apparatus for providing circuit protection functionalities in electric grids, for example DC electric grids.

BACKGROUND OF THE DISCLOSURE

DC electric grids are widely adopted in a variety of applications, such as photovoltaic systems, naval systems, energy storage systems employing batteries (BESS), and the like. As is known, when a fault event (such as an overload or a short-circuit) occurs in a DC electric line, many electrical components electrically connected to the electric line can potentially feed such an electric fault. This may lead to catastrophic consequences, particularly when electric power generation systems (e.g., photovoltaic panels) or electric energy storage systems (e.g., batteries) are installed in the electric grid. In order to prevent such an eventuality, a DC electric grid normally comprises a number of switching apparatuses configured in such a way to allow a selective disconnection of portions of electric grid, when a fault event occurs.

Some switching apparatuses of the state of the art include switching devices of electromechanical type, i.e., switching devices (e.g., circuit breakers) having electric contacts that can be coupled or separated to conduct or block a current, respectively.

In general, these switching devices have the advantage of ensuring a galvanic isolation between disconnected grid portions. Additionally, they are relatively cheap to realize at industrial level.

However, due their operation principles, electromechanical switching devices do not typically provide satisfactory interruption ratings. For example, at relatively high voltages (e.g. up to 1.5 kV DC or above), the opening time can be quite long. Electric arcs, which usually strike between electrical contacts under separation, may consequently last for a relatively long time. Obviously, this fact may entail relevant problems in terms of reliability and maintenance costs.

Other switching apparatuses of the state of the art include switching devices of solid-state type, i.e. switching devices including switching components based on semiconductor materials. The main advantage of solid-state switching devices resides in that they potentially have unlimited electrical endurance due to their arc-less switching operation. Further, these devices are fast operating and have an interruption time remarkably shorter in comparison with the electro-mechanical switching devices. However, they generally require intensive cooling to remove heat generated by the current flow, when they are in a closed state.

In order to mitigate the above-mentioned problems, there have been developed hybrid switching apparatuses employing both electromechanical switching devices and solid-state switching devices. Examples of these protection devices are disclosed in WO2017/186262 and WO2011/057675.

In general, and particularly in case of short-circuits, known switching apparatuses of this type are not capable of suitably managing the current commuted from the employed electromechanical switching device to the solid-state switching devices. For example, they are not capable of intervening as fast as the apparatuses employing solid-state switching devices alone, due to the relatively long time required to commute the current from one electric branch to another. Additionally, solid state switching devices have to be designed to withstand relatively high currents for a relatively long time. Thus, they are often bulky and relatively expensive to manufacture at industrial level.

BRIEF SUMMARY OF THE DISCLOSURE

The main aim of the present disclosure is to provide a hybrid switching apparatus for electric grids, for example DC electric grids, which allows overcoming or mitigating the above-mentioned criticalities. More in particular, an object of the present disclosure is to provide a hybrid switching apparatus, which ensures performant interruption ratings in case of electric faults, particularly in presence of short-circuit currents. As a further object, the present disclosure aims at providing a hybrid switching apparatus, in which cheaper and lower-size solid-state switching devices can be employed with respect to corresponding solutions of the state of the art. Still another object of the present disclosure is providing a hybrid switching apparatus, which can be easily manufactured at industrial level, at competitive costs with respect to the solutions of the state of the art. In order to fulfill these aim and objects, the present disclosure provides a switching apparatus, according to the following claim 1 and the related dependent claims.

The hybrid switching apparatus, according to the disclosure, comprises: first and second electric terminals for electrical connection with corresponding grid portions; a first electric branch comprising one or more switching devices of electromechanical type, each of which has electric contacts that are mechanically coupled or separated to conduct or block a current, respectively; a second electric branch comprising a plurality of switching devices of the solid-state type, each of which includes one or more switching components based on semiconductor materials. Each solid-state switching device is adapted to switch between an on-state, at which said switching device conducts a current, and an off-state, at which said switching device blocks a current. The above-mentioned second electric branch is electrically connected in parallel with said first electric branch between said first and second electric terminals.

According to the disclosure, the switching apparatus comprises a current blocking circuit adapted to block a current flowing along said second electric branch. Said current blocking circuit includes a first switching device of solid-state type and a first electronic circuit electrically connected in parallel to said first switching device of solid-state type.

According to the disclosure, the switching apparatus comprises a current limiting circuit adapted to limit a current flowing along said second electric branch. Said current limiting circuit is electrically connected in series with said current blocking circuit and it includes a second switching device of solid-state type and a second electronic circuit electrically connected in parallel to said second switching device of solid-state type.

According to some embodiments of the disclosure, the first electric branch of said switching apparatus comprises a single switching device of electro-mechanical type capable of switching reversibly between a closed state, at which said first switching device conducts a current, and an open state, at which said first switching device blocks a current.

According to some embodiments of the disclosure, the first electric branch of said switching apparatus comprises a first switching device of electro-mechanical type and a second switching device of electro-mechanical type electrically connected in series.

The first switching device of electro-mechanical type is capable of switching between a closed state, at which said first switching device of electromechanical type conducts a current, and an open state, at which said first switching device of electromechanical type blocks a current. The first switching device of electromechanical type is a self-acting switching device capable of switching from said closed state to said open state upon being driven by a current flowing along said switching apparatus and without receiving an external control signal or an external power supply. In operation, the first switching device of electromechanical type switches from said closed state to said open state, when a current flowing along said switching apparatus exceeds a corresponding predefined threshold value or when a changing rate of a current flowing along said switching apparatus exceeds a corresponding predefined threshold value or upon a combination of these two conditions.

The second switching device of electromechanical type is capable of switching between a closed state, at which said second switching device of electromechanical type conducts a current, and an open state, at which said second switching device of electromechanical type blocks a current. In operation, the second switching device of electromechanical type switches between said closed state and said open state, upon receiving a corresponding input control signal.

Preferably, the first switching device of electromechanical type includes a first actuator capable of exploiting electro-dynamic forces generated by the flow of a current along said switching apparatus for actuating the electric contacts of said first switching device of electromechanical type, thereby causing said first switching device of electromechanical type to switch from said closed state to said open state.

Preferably, said first actuator includes a Thomson coil actuating device operatively coupled to the electric contacts of said first switching device of electromechanical type.

Preferably, the second switching device of electromechanical type includes a second actuator actuating the electric contacts of said second switching device of electromechanical type upon receiving a corresponding input control signal.

The first switching device of solid-state type can be arranged in such a way to be either of uni-directional or of bi-directional type, i.e. able to carry and interrupt only currents flowing in one direction in a DC network, or able to carry and interrupt currents of any direction in a DC or AC network.

According to some embodiments of the disclosure, the first switching device of solid-state type comprises a pair of switching components based on semiconductor materials arranged according to an anti-parallel or anti-series configuration to allow a control of bi-directional currents flowing along said second electric branch.

According to some embodiments of the disclosure, the second electronic branch comprises a first diode bridge operatively associated to said current blocking circuit to allow a control of bi-directional currents flowing along said second electric branch.

Also the second switching device of solid-state type can be arranged in such a way to be either of uni-directional or of bi-directional type.

According to some embodiments of the disclosure, the second switching device of solid-state type comprises a pair of switching components based on semiconductor materials arranged according to an anti-parallel or anti-series configuration to allow a control of bi-directional currents flowing along said second electric branch.

According to some embodiments of the disclosure, the second electronic branch comprises a second diode bridge operatively associated to said current limiting circuit to allow a control of bi-directional currents flowing along said second electric branch.

According to some embodiments of the disclosure, the second electric branch comprises a third diode bridge circuit arranged in such a way to allow a control of bi-directional currents.

Preferably, the above-mentioned first switching device of electromechanical type is adapted to switch from a closed state to an open state, if a short-circuit current flows along said switching apparatus.

Preferably, the above-mentioned first switching device of electromechanical type is adapted not to switch from a closed state to an open state, if an overload current or a normal current flows along said switching apparatus.

Preferably, the above-mentioned second switching device of electromechanical type is adapted to switch from a closed state to an open state, if a short-circuit current flows along said switching apparatus. However, said second switching device of electromechanical type may be commanded to switch from a closed state to an open state, also if an overload current or a normal current flows along said switching apparatus.

Preferably, the above-mentioned first switching device of solid-state type is adapted to switch from an on-state to an off-state after a first time interval has passed from an instant, in which a short-circuit current has been commuted from said first electric branch to said second electric branch.

Preferably, the above-mentioned first switching device of solid-state type is adapted to switch from an on-state to an off-state after a third time interval has passed from an instant, in which an overload current or a normal current has been commuted from said first electric branch to said second electric branch.

Preferably, the above-mentioned second switching device of solid-state type is adapted to switch from an on-state to an off-state after a current has been commuted from said first electric branch to said second electric branch.

In a further aspect, the present disclosure relates to a method for protecting an electric grid, according to the following claim 18 and the related dependent claims.

In general, said electric grid comprises a plurality of switching groups for electrically connecting or disconnecting different grid portions of said electric grid.

Preferably said electric grid comprises a battery energy storage system including a plurality of battery units, a DC-bus for electrically connecting said battery units to a power converter and a plurality of switching groups for electrically connecting or disconnecting said battery units to or from said DC-bus.

Each switching group comprises: a switching apparatus of the disclosure capable of controlling bi-directional currents. Said switching apparatus is capable of switching in a closed state, in which said switching apparatus conducts a current, or in an open state, in which said switching apparatus blocks a current, or in a current limiting mode, in which said switching apparatus limits a current commuted from said first electric branch to said second electric branch; a disconnector electrically connected in series with said switching apparatus. Said disconnector is capable of switching in a closed state, in which said disconnector conducts a current, or in an open state, in which said disconnector blocks a current.

Each switching group is capable of switching in a closed state, in which said switching apparatus is in a closed state and said disconnector is in a closed state, or in an open state, in which said switching apparatus is in an open state and said disconnector is in an open state, or in a current limiting mode, in which said switching apparatus is in a current limiting mode and said disconnector is in a closed state.

The method of the disclosure comprises the following steps: if there is an electric fault in said electric grid, switching said switching groups in a current limiting mode; switching the switching group, which is closest to said electric fault, in an open state and maintaining the remaining switching groups of said electric grid in a current limiting mode; if said electric fault is electrically isolated within a predefined time interval when the switching group, which is closest to said electric fault, is in an open state: maintaining the switching group, which is closest to said electric fault, in an open state and switching the remaining switching groups of said electric grid in a closed state; if said electric fault is not electrically isolated within a predefined time interval when the switching group, which is closest to said electric fault, is in an open state: switching all the switching groups of said electric grid in an open state.

BRIEF DESCRIPTION OF THE SEVERAL VIEWS OF THE DRAWING(S)

Further characteristics and advantages of the disclosure will emerge from the description of preferred, but not exclusive embodiments of the contactor, according to the disclosure, non-limiting examples of which are provided in the attached drawings, wherein:

FIGS. 1-7 schematically show some embodiments of the switching apparatus, according to the disclosure;

FIG. 8 schematically shows a DC electric grid including the switching apparatus, according to the disclosure;

FIGS. 9-16 schematically show examples of operation of a DC electric grid including a battery energy storage system comprising a number of switching groups, each of which includes a switching apparatus, according to the disclosure.

DETAILED DESCRIPTION OF PREFERRED EMBODIMENT(S)

With reference to the cited figures, the present disclosure relates to a hybrid switching apparatus 1 for electric grids. The switching apparatus of the disclosure is particularly suitable for use in low-voltage DC electric grids and it will be described hereinafter with particular reference to these applications for the sake of brevity only, without intending to limit the scope of the disclosure in any way. The switching apparatus of the disclosure may, in fact, be successfully used in electric systems of different type, such as low-voltage AC electric grids or medium-voltage AC or DC electric grids. For the purpose of the present application, the term "low-voltage" (LV) relates to operating voltages lower than 1 kV AC and 1.5 kV DC whereas the term "medium-voltage" (MV) relates to operating voltages higher than 1 kV AC and 1.5 kV DC up to some tens of kV, e.g. up to 72 kV AC and 100 kV DC.

In reference to FIG. 1, a switching apparatus 1 comprises first and second electric terminals 11, 12 for electrical connection with corresponding grid portions (not shown), for example a DC link bus and an electric load. Preferably, at one of the electric terminals 11-12, a disconnector (or another equivalent switching device) 150 is operatively associated to the switching apparatus 1 to form a switching group 110. The disconnector 150 is arranged for electrically connecting or disconnecting the switching apparatus with or from another circuit portion of the electric grid. The disconnector 150 is thus capable of providing a galvanic insulation between different circuit portions (one of which includes the switching apparatus 1), whenever necessary. To this aim, the disconnector 150 is adapted to switch reversibly between a closed state, at which it conducts a current, and an open state, at which it blocks a current.

The disconnector 150 may or may not be part of the switching apparatus. In general, the disconnector 150 may be of known type. Therefore, its functionalities will be described in the following only in relation to the aspects of interest of the disclosure.

The switching apparatus 1 comprises a first electric branch 3 and a second electric branch 4 electrically connected in parallel between the electric terminals 11, 12. The first electric branch 3 comprises one or more switching devices 30, 31, 32 of electromechanical type, i.e. switching devices having electric contacts that can be coupled or separated upon the exertion of suitable mechanical or electromechanical forces. Each electromechanical switching device 30, 31, 32 of the first electric branch 3 has electric contacts that can be mechanically coupled or separated to conduct or block a current, respectively.

More particularly, each electromechanical switching device 30, 31, 32 of the first electric branch 3 has one or more fixed contacts and one or more movable contacts that can be coupled to or uncoupled from said fixed contacts to conduct or block a current. Each electromechanical switching device 30, 31, 32 of the first electric branch 3 is in a closed state when its electric contacts are mutually coupled to conduct a current, whereas it is in an open state when its electric contacts are mutually uncoupled to block a current. In general, the one or more switching devices 30, 31, 32 of the first electric branch 3 may be realized according to solutions of known type. Therefore, they will be described in the following only in relation to the aspects of interest for the disclosure.

According to some embodiments of the disclosure (FIGS. 1, 3, 5, 6), the first electric branch 3 comprises a single switching device 30 of electromechanical type capable of switching between a closed state, at which said switching device conducts a current, and an open state, at which said switching device blocks a current.

Preferably, the switching device 30 switches from a closed state to an open state (opening maneuver) or from an open state to a closed state (closing maneuver) in response to receiving a suitable input control signal, which causes the activation of a driving mechanism moving the movable contacts or tripping the motion of said movable contacts.

As it is illustrated in the following, the control signals for controlling the operation of the switching device 30 may be conveniently provided by a control unit 90, which may be or may not be part of the switching apparatus.

In operation, the switching device 30 may be commanded to switch from a closed state to an open state when a normal current, an overload current or a short-circuit current flows along the switching apparatus, according to the needs.

For the sake of clarity, it is specified that, within the purposes of the present application: a "normal current" is a current typically having operating values about the nominal value (e.g. up to 1.1 times the nominal value or lower; an "overload current" is a current typically having higher operating values, e.g. from 1.1 times the nominal value up to 10 times the nominal value; a "short-circuit current" is a current typically having even higher operating values, e.g. from 10 times the nominal value up tens of times the nominal value.

According to other embodiments of the disclosure (FIGS. 2, 4, 5A, 7), the first electric branch 3 comprises a first switching device 31 of electromechanical type and a second switching device 32 of electromechanical type, which are electrically connected in series.

The switching device 31 is a self-acting switching device capable of fast switching from a closed state to an open state when it is driven by a current flowing along the switching apparatus. The switching device 31 can thus carry out an opening maneuver without receiving an external control signal commanding such a maneuver or without receiving an external power supply.

For the sake of clarity, within the scope of the present disclosure, a switching device of electromechanical type is considered as "fast switching", if it shows an opening time of the electric contacts shorter than 1 ms, more preferably shorter than 500 µs.

The switching device 31 is adapted to switch fast from a closed state to an open state (opening maneuver) when the current flowing along the switching apparatus exceeds a corresponding threshold value (e.g. a short-circuit value, typically 10-20 times the nominal value) or when the change of rate of the current exceeds a corresponding threshold value (e.g. larger than 10 kA/ms) or when a combination of these two last conditions occurs.

Preferably, the switching device 31 is adapted to switch fast from a closed state to an open state (opening maneuver) whenever a short-circuit current flows along the switching apparatus and it is adapted not to switch from a closed state to an open state (opening maneuver), when an overload current or a normal current flows along the switching apparatus.

Preferably, the switching device 31 comprises a first actuator (not shown) capable of exploiting electrodynamic forces generated by the circulation of a current along the switching apparatus for actuating the electric contacts, during an opening maneuver.

Preferably, the switching device 31 comprises a Thomson coil actuating device (not shown) operatively coupled to the electric contacts (e.g. through a suitable kinematic chain), so as to actuate said electric contacts during an opening maneuver.

The Thomson coil actuating device is adapted to provide a sufficient actuation force to separate the electric contacts of the switching device 31 when the circulating current exceeds a corresponding threshold value and/or when the rate of change of the current exceeds a corresponding threshold value, in particular when the circulating current is a short-circuit current.

In general, the Thomson coil actuating device is operatively connected to the electric contacts of the first switching device 31 of electromechanical type (which are arranged along said first electric branch) through a suitable kinematic chain.

According to some embodiments of the disclosure, the Thomson coil actuating device is electrically connected in series to the above-mentioned first terminal 11 or second terminal 12 of the switching apparatus. More particularly, the Thomson coil may be arranged between the first terminal 11 or the second terminal 12 and a common node of the first electric branch 3 and the second electric branch 4 (at which said electric branches separate one from another).

According to other embodiments of the disclosure, the Thomson coil actuating device is arranged along the first electric branch 3 and it is electrically connected in series with the electric contacts of the first switching device 31 of electromechanical type.

According to some embodiments of the disclosure, the first switching device 31 of electromechanical type is adapted to immediately return to a closed state following an opening maneuver, if a current does not flow along the first electric branch 3 anymore or if the current returns to lower intensity values for any reason. To this aim, the first switching device 31 include a suitable spring-operated mechanism (not shown) actuating the electric contacts by exploiting elastic energy stored during an opening maneuver.

According to other embodiments of the disclosure, the first switching device 31 of electromechanical type is adapted to maintain an open state once an opening maneuver has been carried out. To this aim, the first switching device 31 of electromechanical type may include a suitable latching mechanism (not shown) capable of maintaining separated the electric contacts and an actuation mechanism (not shown) to couple the electric contacts upon receiving a corresponding input control signal.

According to additional variants of the disclosure (not shown), an electronic circuit (e.g. including a snubber circuit, spark gaps, discharge tubes, a Metal-Oxide Varistor, or a semiconductor component) is electrically connected in parallel to the first switching device 31 to protect this latter (e.g. by limiting voltage transients) during an opening maneuver of said switching device and/or to dissipate electric energy, whenever necessary.

According to the above-mentioned embodiments of the disclosure (FIGS. 2, 4, 5A, 7), the first electric branch 3 comprises the second switching device 32 of electromechanical type electrically connected in series with the first switching device 31 of electromechanical type.

The switching device 32 of electromechanical type is fully controllable and it reversibly switches between a closed state and an open state upon receiving corresponding input control signals commanding the execution of a maneuver.

As it is illustrated in the following, the control signals for controlling the operation of the switching device 32 of electromechanical type may be conveniently provided by a control unit 90, which may be or may not be part of the switching apparatus.

In general, the switching device 32 of electromechanical type has an opening time quite longer than the first switching device, for example a few ms (e.g., about 5 to 20 ms).

Preferably, the switching device 32 of electromechanical type includes a second actuator of the electro-mechanical type actuating the electric contacts of the second switching device upon receiving corresponding input control signals.

Preferably, the switching device 32 of electromechanical type is commanded to switch from a closed state to an open state whenever the first switching device 31 switches from a closed state to an open state, in particular when a short-circuit current (e.g., having value 10-20 times the nominal value) flows along the first electric branch 3.

However, differently from the first switching device 31 of electromechanical type, the second switching device 32 of electromechanical type may be commanded to switch from a closed state to an open state (opening maneuver) even when the current circulating along the first electric branch 3 takes values lower than the above-mentioned short-circuit values.

Thus, the second switching device 32 of electromechanical type may be commanded to carry out an opening maneuver if an overload current (e.g. having value 2-3 times the nominal value) flows along the first electric branch 3 or even when a current flowing along the first electric branch 3 takes normal values (e.g. about or below the nominal value), if an opening maneuver of the hybrid switching apparatus has to be carried out, e.g. on request of an operator.

As mentioned above, the first and second switching devices 31 and 32 of electromechanical type are electrically connected in series. In this way, these switching devices can control the current circulating along the first electric branch 3 in a suitable way depending on the nature of such a current.

For example, if the current circulating along the first electric branch 3 is a short-circuit current, the first switching device 31 of electromechanical type intervenes fast to carry out an opening maneuver and it blocks said current without the need of receiving input control signals. In this case, the second switching device 32 of electromechanical type is commanded to carry out an opening maneuver as well. However, since it is slower than the first switching device 31, the second switching device 32 of electromechanical type will perform such an opening maneuver later than the first switching device 31, typically when the current has already commuted on said second electric branch 4.

If the current flowing along the first electric branch 3 is a normal current or an overload current, the first switching device 31 of electromechanical type does not intervene and the second switching device 32 of electromechanical type may be commanded to carry out an opening maneuver to block such a current, upon receiving suitable control signals in input.

According to the disclosure, the second electric branch 4 comprises a plurality of switching devices 41, 42 of the solid-state type.

Each switching device 41, 42 of solid-state type includes one or more switching components based on semiconductor materials. In general, said semiconductor switching components may be of conventional type, such as, for example, Power MOSFETs, JFETs, Insulated Gate Bipolar Transistors ("IGBTs"), Gate Turn-Off Thyristors (GTOs), Integrated Gate-Commutated Thyristors ("IGCTs"), or the like.

In response to receiving suitable input control signals, each solid-state switching device 41, 42 of the second electric branch 4 can reversibly switch between an on-state, at which it conducts a current, and an off-state, at which it blocks a current.

A solid-state switching device 41, 42 is turned off when it switches from an on-state to an off-state and it is turned on when it switches from an off-state to an on-state.

As it is illustrated in the following, the control signals for controlling the operation of the switching devices 41, 42 of the solid-state type may be conveniently provided by a control unit 90, which may be or may not be part of the switching apparatus.

According to the disclosure, the second electric branch 4 comprises a current blocking circuit 40A adapted to block the current circulating along the second electric branch 4.

The blocking circuit 40A includes a first switching device 41 of solid-state type and a first electronic circuit 48 adapted to protect said first switching device of solid-state type (e.g., from voltage transients) and dissipate electric energy, whenever necessary.

The first electronic circuit 48 is electrically connected in parallel to the switching device 41 of the solid-state type and it may include a snubber circuit, spark gaps, discharge tubes, a Metal-Oxide Varistor, or a semiconductor component.

In general, the first switching device 41 of the solid-state type is operated depending on the behavior of the current circulating along the second electric branch 4 and depending on the behavior of the switching devices 30 or 31, 32 of the first electric branch 3.

As it will better emerge from the following, this solution allows managing in an efficient way operating conditions in which overload currents or short-circuit currents circulate.

Preferably, if it is in an off-state for any reason, the first switching device 41 of the solid-state type is commanded to switch in an on-state as soon as or before the switching device 30 or the first switching device 31 or the second switching device 32 of electro-mechanical type carries out an opening maneuver. In this way, a current circulating along the first electric branch 3 is allowed to commute to the second electric branch 4.

Preferably, the first switching device 41 of the solid-state type is turned off after first time interval has passed from an instant, in which a short-circuit current (i.e. higher than a predefined short-circuit threshold value) has been fully commuted from the first electric branch 3 to the second electric branch 4 due to an opening maneuver by the switching device 30 or the first switching device 31 of electromechanical type.

Preferably, the above-mentioned first time interval is calculated depending on the minimum time requested to restore the dielectric withstand of the gap between the electric contacts of the switching device 30 or the first switching device 31 of electro-mechanical type in order to avoid possible re-strike of the arc (such a minimum time is often referred to as "gap clearing time"). Conveniently, if communication between switching apparatuses of an electric grid is possible, the first time interval may be altered in order to coordinate better the operation of such switching apparatuses.

In practice, the above-mentioned first time interval is selected to be long enough to prevent re-strike phenomena between the electric contacts of the switching device 30 or the first switching device 31 of electro-mechanical type and short enough to prevent overheating damages to the first switching device 41 of solid-state type.

When a short-circuit current flows along the second electric branch 4 and the fault generating such a short-circuit cannot be cleared before the above-mentioned first time interval has passed, the first switching device 41 of solid-state type is turned off.

Since it is turned off with a certain time delay from the instant in which a short-circuit current has been fully commuted along the second electric branch 4, in certain conditions, the first switching device 41 of solid-state may remain turned on even if a short-circuit current was initially present.

When a short-circuit current has been commuted along the second electric branch 4 and the fault generating such a short-circuit can be cleared in some way (e.g. due to the intervention of an external circuit breaker) before the above-mentioned first time interval has passed, the first switching device 41 of solid-state type is not turned off and it remains in an on-state even if a short-circuit current was initially flowing along the second electric branch 4.

Preferably (but not necessarily as an alternative with the solution illustrated above), the first switching device 41 of solid-state type may be commanded to turn off for self-protection purposes if one or more of the following conditions are realized: the current flowing along the electric branch 4 exceeds a given threshold current value; the temperature of the switching device 41 exceeds a given threshold temperature value; the voltage across the switching device 41 exceeds a given threshold voltage value; the electric power dissipated by switching device 41 exceeds a given threshold power value.

Also this solution provides some remarkable advantages. For example, when the electric protection device 1 is reconnected to the electric line with the switching device 30 or the switching devices 31, 32 of electro-mechanical type in an open state and a short-circuit current flows along the second electric branch 4 due to the presence of a pre-existing fault, the first switching device 41 of solid-state type is turned off as soon as a second time interval (in practice the time needed to detect the presence of a fault by suitably processing detection signals indicative of the above-mentioned physical quantities) has passed, so that overheating damages are prevented.

Preferably, the first switching device 41 of solid-state type is commanded to turn off also after a third time interval has passed, from the instant in which an overload current (i.e. higher than a predefined overload threshold value) or a normal current (i.e. having values about the nominal value or lower) has been commuted from the first electric branch 3 to the second electric branch 4 upon an opening maneuver of the switching device 30 or by the switching device 32 of electro-mechanical type (the switching device 31 does not intervene in this case).

Conveniently, the above-mentioned third time interval is calculated basing on criteria similar to the above-mentioned first time interval. In general, the above-mentioned third time interval may be different from or equal to the above-mentioned first time interval, according to the needs.

According to the disclosure, the second electric branch 4 comprises also a current limiting circuit 40 adapted to limit the current flowing along the second electric branch 4.

The current limiting circuit 40 is electrically connected in series with the above-mentioned current blocking circuit 40A. The current limiting circuit 40 includes a second switching device 42 of solid-state type and a second electronic circuit 49 adapted to limit the current, protect the switching device 42 (e.g. from voltage transients) and dissipate electric energy, whenever necessary.

The second electronic circuit 49 is electrically connected in parallel to the switching device 42 and it preferably includes a varistor or a resistive device or both. In general, the second switching device 42 of solid-state type is operated depending on the behavior of the current flowing along the second electric branch 4. For example, the second switching device 42 of solid-state type may be switched on to bypass the second electronic circuit 49 and facilitate the commutation of the current from the first electric branch 3 to the second electric branch 4.

As another example, the second switching device 42 of solid-state type may be switched off if the current flowing along the second electric branch 4 has to be limited. In this way, a fault current may be conducted along the second electric branch 4 without the need of over-sizing the first switching device 41 of solid-state type.

Preferably, if it is in an on-state for any reason, the second switching device 42 of solid-state type is commanded to switch in an on-state at the same time of the switching device 41 of solid-state type as soon as or before the switching device 30 or the first switching device 31 or the second switching device 32 of electro-mechanical type carries out an opening maneuver. In this way, a current flowing along the first electric branch 3 is enabled to commute to the second electric branch 4.

Preferably, the second switching device 42 of solid-state type is turned off after a short-circuit current (i.e. higher than a predefined short-circuit threshold value) has been commuted from the first electric branch 3 upon an opening maneuver of the switching device 30 or the first switching device 31 of electro-mechanical type.

Preferably, when a short-circuit current flows along the second electric branch 4 (since the commutation from the first electric branch 3 is complete) and the fault generating such a short-circuit cannot be cleared in any way, the second switching device 42 of solid-state type (which bypasses the second electronic circuit 49) is turned off to force the current to flow along the second electronic circuit 49 and limit said current.

Preferably, when a short-circuit current flows along the second electric branch 4 and the fault generating such a short-circuit is cleared in some way (e.g. due to the intervention of an external circuit breaker), the second switching device 42 of solid-state type is initially turned off to provide current limitation functionalities (as illustrated above) but it is turned on again once the fault is cleared and the current returns to lower values. After reclosing the switching device 30 or the first switching device 31 or the second switching device 32 of electro-mechanical type, the current will commute back to the first electric branch 3.

Conveniently, the second switching device 42 of solid-state type may be commanded to turn off also after an overload current has been commuted from the first electric branch 3 to the second electric branch 4 upon an opening maneuver by the switching device 30 or the second switching device 32 of electro-mechanical type (the first switching device 31 does not intervene in this case).

Conveniently, the second switching device 42 of solid-state type may be commanded to turn off also after a normal current (i.e. having values about the nominal value or lower) has been commuted from the first electric branch 3 to the second electric branch 4, when an opening maneuver of the switching device 30 or the second switching device 32 of electromechanical type is carried out for any reason.

FIG. 1 shows a possible embodiment of the switching apparatus 1 of the disclosure. In this case, the first electric branch 3 comprises a single switching device 30 of electro-mechanical type and the second electric branch 4 comprises the current blocking circuit 40A and the current limiting circuit 40. According to this embodiment of the disclosure, the switching apparatus 1 normally allows the flow of a current between the terminals 11, 12. However, whenever necessary, it is capable of providing electric isolation (open state) for a wide range of currents flowing along an electric line.

The switching apparatus 1 is also capable of providing current limiting functionalities (current limiting mode), in particular when a short-circuit current is present. The operation of the switching apparatus in the embodiment of FIG. 1 is described in more details in the following.

Closed state (normal operation): In normal operation (i.e. in presence of electric currents about or below the nominal value), the switching device 30 of electromechanical type is in a closed state while the first and second switching devices 41, 42 of solid-state type may be turned on or turned off, according to the needs. Also the disconnector 150 is in a closed state. Even if the switching devices 41, 42 of solid-state type are turned on for any reason, the current naturally flows predominantly along the first electric branch 3 as this latter shows a lower equivalent resistance.

Interruption of overload or normal currents: The switching device 30 of electromechanical type is supposed to be in a closed state. In presence of overload currents, the switching device 30 is commanded to carry out an opening maneuver. If they are not already in an on-state, the first and second switching devices 41, 42 of solid-state type are commanded to turn on. As soon as the electric contacts of the switching device 30 separate, a current starts flowing along the second electric branch 4. The full commutation of the current from the first electric branch 3 to the second electric branch 4 extinguishes arcing phenomena between the electric contacts of the switching device 30.

After a third time interval has passed from the instant in which the current has commuted from the first electric branch 3 to the second electric branch 4 (so that the switching device 30 has sufficient dielectric withstand to avoid arc re-strike), the switching devices 41, 42 of solid-state type are commanded to turn off. The overload current is forced to circulate along the first and second electronic circuits 48, 49 until extinction.

As an alternative, after the full commutation of the current to the second electric branch 4, the switching device 42 of solid-state type is commanded to turn off and the current is forced to circulate along the second electronic circuit 49 and the first switching device 41 of solid-state type.

In both these cases, the switching apparatus 1 provides current limiting functionalities of the overload current (current limiting mode). The switching device 41 of solid-state type is then commanded to turn off after the above-mentioned third time interval has passed from the instant in which the overload current is commuted to the second electric branch 4.

As a further alternative, after the full commutation of the current to the second electric branch 4, only the switching device 41 of solid-state type is commanded to turn off (open state) after the above-mentioned third time interval has passed. In this case, the current is forced to circulate along the first electronic circuit 48 until extinction.

The current cannot re-start flowing along the first electric branch 3 as the switching device 30 of electromechanical type is in an open state.

Conveniently, after current interruption, the disconnector 150 is commanded to carry out an opening maneuver, thereby providing a galvanic insulation for the grid portion including the switching apparatus.

The switching apparatus behaves in a same way when it is requested to interrupt normal currents for any reason.

Interruption of short-circuit currents: The switching device 30 of electromechanical type are supposed to be in a closed state. In presence of short-circuit currents, the switching device 30 carries out an opening maneuver, preferably without the need of receiving an input control signal or an external power supply. The first and second switching devices 41, 42 of solid-state type are commanded to turn on, if they are not in a conducting state already. The separation of the electric contacts of the switching device 30 forces the current to commute to the second electric branch 4. The full commutation of the current from the first electric branch 3 to the second electric branch 4 extinguishes arcing phenomena between the electric contacts of the switching device 30 of electromechanical type. The short-circuit current, which is commuted to the second electric branch 4, initially flows through both the first and second switching devices 41, 42 of solid-state type. As soon as the current is fully commuted to the second electric branch 4, the second switching device 42 of solid-state type is commanded to turn off and the current is forced to circulate along the second electronic circuit 49 and the first switching device 41 of solid-state type. In this situation, the switching apparatus 1 provides current limiting functionalities of the short-circuit current (current limiting mode).

The switching device 41 should be commanded to turn off after the above-mentioned first time interval has passed from the instant in which the short-circuit current is commuted to the second electric branch 4. However, if the fault generating the short-circuit current is cleared in some way (e.g. due to the intervention of an external circuit breaker) before the above-mentioned first time interval has passed, the switching device 41 is not commanded to turn off and it remains in an on-state as the current flowing along the second electric branch 4 returns to lower values. In this case, the second switching device 42 of solid-state type may be maintained in an off-state. As an alternative, the second switching device 42 of solid-state type may be newly commanded to turn on and the current flowing along the electric branch 4 may newly flow along the first and second switching devices 41, 42 of solid-state type.

Anyway, in the meanwhile, the switching device 30 of electromechanical type is commanded to carry out a closing maneuver. When the switching device 30 finally returns in a closed state, the switching apparatus 1 will newly operate in normal conditions as the current naturally commutes from the second electric branch 4 to the first electric branch 3. Instead, if the fault generating the short-circuit current is not cleared before the above-mentioned first time interval has passed, the first switching device 41 of solid-state type is commanded to turn off. The current is forced to circulate along the first and second electronic circuits 48, 49 until extinction. As illustrated above, the current cannot re-start flowing along the first electric branch 3.

Subsequently, the disconnector 150 is commanded to carry out an opening maneuver, thereby providing a galvanic insulation for the grid portion including the switching apparatus.

Reconnection to an electric line: The switching device 30 of electromechanical type is supposed to be in an open state while the first and second switching devices 41, 42 of solid-state type are supposed to be in an off-state. The disconnector 150 is commanded to carry out a closing maneuver. The galvanic isolation of the grid portion including the switching apparatus from the other grid portion (not including the switching apparatus) is no more ensured.

The switching device 41 of solid-state type is commanded to turn on. As an alternative, both the switching devices 41, 42 of solid-state type are commanded to turn on.

The current flows along the second semiconductor branch 4. If only the switching device 41 of solid-state type is turned on, the current flows along the second electronic circuit 49 and the switching device 41. If both the switching devices 41, 42 of solid-state type are turned on, the current flows along both these switching devices. If a short-circuit is not detected within a second predefined time interval (necessary to check whether a short-circuit is present), the switching device 30 is commanded to carry out a closing maneuver.

As mentioned above, the fourth switching device 42 may be either in an on-state or in an off-state. If the fourth switching device 42 is in an on-state, it may be maintained in that state or be turned-off. If it is in an off-state, it may be maintained in that state or be turned-on. The second switching device 42 of solid-state type may be maintained in an on-state or be turned-off.

As soon as the switching device 30 has completed the closing maneuver, the switching apparatus 1 starts operating in normal conditions and the current naturally commutes to the first electric branch 3.

Reconnection to an electric line in presence of short-circuit fault: The switching device 30 of electromechanical type is supposed to be in an open state while the first and second switching devices 41, 42 of solid-state type are supposed to be in an off-state. The disconnector 150 is commanded to carry out a closing maneuver. The galvanic isolation of the grid portion including the switching apparatus from the other grid portion (not including the switching apparatus) is no more ensured. The switching device 41 of solid-state type is commanded to turn on while the switching device 42 is maintained in an off-state and it is turn-on later than the switching device 41. As an alternative, both the switching devices 41, 42 of solid-state type are commanded to turn on simultaneously. A short-circuit current initially flows along the second semiconductor branch 4.

When only the third witching device 41 is turned on, the current flows along the second electronic circuit 49 and the third switching device 41 (current limiting mode). After a first predefined time interval (necessary to identify the short-circuit condition), the third switching device 41 is commanded to turn off. The current is forced to circulate along the first electronic circuits 48 until extinction.

When both the third and fourth switching devices 41, 42 are turned on simultaneously, the current flows along both these switching devices. After a first predefined time interval, the third switching device 41 is commanded to turn off, whereas the fourth switching device 42 may be turned off or maintained in on-state. The current is forced to circulate along the first electronic circuits 48 until extinction.

The switching device 30 is not commanded to carry out a closing maneuver and it remains in an open state. Subsequently, the disconnector 150 is commanded to carry out an opening maneuver, thereby providing a galvanic insulation for the grid portion including the switching apparatus.

It is evident from the above that the switching apparatus 1, when arranged according to the embodiment of FIG. 1, can operate in three distinct states: a closed state (normal operation), an open state, in which it blocks the current commuted from the first electric branch 3 to the second electric branch 4, or in a current limiting mode (transient condition), in which it limits the current commuted from the first electric branch 3 to the second electric branch 4.

It is additionally evidenced how the switching group 110 formed by the switching apparatus 1 and the disconnector 150 electrically connected in series can operate according to different states: a closed state, in which the switching apparatus 1 is in a closed state and the disconnector 150 is in a closed state, an open state, in which the switching apparatus 1 is in an open state and the disconnector 150 is in an open state, or a current limiting mode, in which the switching apparatus 1 is in a current limiting mode and the disconnector 150 is in a closed state.

FIG. 2 shows a possible embodiment of the switching apparatus 1 of the disclosure.

In this case, the first electric branch 3 comprises the first and second switching devices 31, 32 of electromechanical type electrically connected in series and the second electric branch 4 comprises the current blocking circuit 40A and the current limiting circuit 40.

According to this embodiment of the disclosure, the switching apparatus 1 normally allows the flow of a current between the terminals 11, 12. However, whenever necessary, it is capable of providing electric isolation (open state) for a wide range of currents flowing along an electric line. Also in this case, the switching apparatus 1 is also capable of providing current limiting functionalities (current limiting mode), in particular when a short-circuit current is present. The operation of the switching apparatus in the embodiment of FIG. 2 is described in more details in the following.

Closed state (normal operation): In normal operation (i.e. in presence of electric currents about or below the nominal value), the first and second switching devices 31, 32 of electromechanical type are in a closed state while the first and second switching devices 41, 42 of solid-state type may be turned on or turned off, according to the needs. Also the disconnector 150 is in a closed state. Even if the switching devices 41, 42 of solid-state type are turned on for any reason, the current naturally flows predominantly along the first electric branch 3 as this latter shows a lower equivalent resistance.

Interruption of overload or normal currents: The first and second switching devices 31, 32 of electromechanical type are supposed to be in a closed state. In presence of overload or normal currents, the switching device 31 of electromechanical type does not intervene (thereby remaining in a closed state) whereas the switching device 32 of electromechanical type is commanded to carry out an opening maneuver. If they are not already in an on-state, the first and second switching devices 41, 42 of solid-state type are commanded to turn on. As soon as the electric contacts of the second switching device 32 of electromechanical type separate, a current starts flowing along the second electric branch 4. The full commutation of the current from the first electric branch 3 to the second electric branch 4 extinguishes arcing phenomena between the electric contacts of the switching device 32 of electromechanical type.

After a third time interval has passed from the instant in which the current has commuted from the first electric branch 3 to the second electric branch 4 (so that the switching device 32 of electromechanical type has sufficient dielectric withstand to avoid arc re-strike), the switching devices 41, 42 of solid-state type are commanded to turn off (open state). The overload current is forced to circulate along the first and second electronic circuits 48, 49 until extinction. As an alternative, after the full commutation of the current to the second electric branch 4, the switching device 42 of solid-state type is commanded to turn off and the current is forced to circulate along the second electronic circuit 49 and the switching device 41. In both these cases, the switching apparatus 1 provides current limiting functionalities of the overload current (current limiting mode). The switching device 41 of solid-state type is then commanded to turn off after the above-mentioned third time interval has passed from the instant in which the overload current is commuted to the second electric branch 4.

As a further alternative, after the full commutation of the current to the second electric branch 4, only the switching device 41 of solid-state type is commanded to turn off (open state) after the above-mentioned third time interval has passed. In this case, the current is forced to circulate along the first electronic circuit 48 until extinction. The current cannot re-start flowing along the first electric branch 3 as the second switching device 32 of electromechanical type is in an open state. Conveniently, after current interruption, the disconnector 150 is commanded to carry out an opening maneuver, thereby providing a galvanic insulation for the grid portion including the switching apparatus. The switching apparatus behaves in a same way when it is requested to interrupt normal currents for any reason.

Interruption of short-circuit currents: The first and second switching devices 31, 32 of electromechanical type are supposed to be in a closed state. In presence of short-circuit currents, the switching device 31 of electromechanical type immediately carries out (fast switching) an opening maneuver without the need of receiving an input control signal or an external power supply. The first and second switching devices 41, 42 of solid-state type are commanded to turn on, if they are not in a conducting state already. Also, the switching device 32 of electromechanical type is commanded to carry out an opening maneuver. However, the intervention of the switching device 31 of electromechanical type occurs well before the switching device 32. The separation of the electric contacts of the switching device 31 of electromechanical type forces the current to commute to the second electric branch 4. The full commutation of the current from the first electric branch 3 to the second electric branch 4 extinguishes arcing phenomena between the electric contacts of the switching device 31 of electromechanical type.

The short-circuit current, which is commuted to the second electric branch 4, initially flows through both the first and second switching devices 41, 42 of solid-state type.

As soon as the current is fully commuted to the second electric branch 4, the switching device 42 of solid-state type is commanded to turn off and the current is forced to circulate along the second electronic circuit 49 and the switching device 41.

In this situation, the switching apparatus 1 provides current limiting functionalities of the short-circuit current (current limiting mode).

The switching device 41 of solid-state type should be commanded to turn off after the above-mentioned first time interval has passed from the instant in which the short-circuit current is commuted to the second electric branch 4.

However, if the fault generating the short-circuit current is cleared in some way (e.g. due to the intervention of an external circuit breaker) before the above-mentioned first time interval has passed, the switching device 41 of solid-state type is not commanded to turn off and it remains in an on-state as the current flowing along the second electric branch 4 returns to lower values. In this case, the second switching device 42 of solid-state type may be maintained in an off-state. As an alternative, the second switching device 42 of solid-state type may be newly commanded to turn on and the current flowing along the electric branch 4 may newly flow along the first and second switching devices 41, 42 of solid-state type.

Anyway, in the meanwhile, the switching device 31 of electromechanical type returns in a closed state and the switching device 32 is commanded to carry out a closing maneuver. When both the switching devices 31, 32 of electromechanical type finally return in a closed state, the switching apparatus 1 will newly operate in normal conditions as the current naturally commutes from the second electric branch 4 to the first electric branch 3. Instead, if the fault generating the short-circuit current is not cleared before the above-mentioned first time interval has passed, the switching device 41 of solid-state type is commanded to turn off (open state). The current is forced to circulate along the first and second electronic circuits 48, 49 until extinction. As illustrated above, the current cannot re-start flowing along the first electric branch 3.

Subsequently, the disconnector 150 is commanded to carry out an opening maneuver, thereby providing a galvanic insulation for the grid portion including the switching apparatus.

Reconnection to an electric line: The first switching device 31 of electromechanical type is supposed to be already in a closed state, the second switching device 32 of electromechanical type is supposed to be in an open state while the first and second switching devices 41, 42 of solid-state type are supposed to be in an off-state. The disconnector 150 is commanded to carry out a closing maneuver. The galvanic isolation of the grid portion including the switching apparatus from the other grid portion (not including the switching apparatus) is no more ensured. The switching device 41 is commanded to turn on. As an alternative, both the switching devices 41, 42 of solid-state type are commanded to turn on. The current flows along the second semiconductor branch 4. If only the switching device 41 of solid-state type is turned on, the current flows along the second electronic circuit 49 and the switching device 41. If both the switching devices 41, 42 of solid-state type are turned on, the current flows along both these switching devices. If a short-circuit is not detected within a second predefined time interval (necessary to check whether a short-circuit is present), the second switching device 32 is commanded to carry out a closing maneuver.

As mentioned above, the fourth switching device 42 may be either in an on-state or in an off-state. If the fourth switching device 42 is in an on-state, it may be maintained in that state or be turned-off. If it is in an off-state, it may be maintained in that state or be turned-on. As soon as the switching device 32 of electromechanical type has completed the closing maneuver (the switching device 31 of electromechanical type is already in a closed state), the switching apparatus 1 starts operating in normal conditions and the current naturally commutes to the first electric branch 3.

Reconnection to an electric line in presence of short-circuit fault: The first switching device 31 of electromechanical type is supposed to be already in a closed state, the second switching device 32 of electromechanical type is supposed to be in an open state while the first and second switching devices 41, 42 of solid-state type are supposed to be in an off-state. The disconnector 150 is commanded to carry out a closing maneuver. The galvanic isolation of the grid portion including the switching apparatus from the other grid portion (not including the switching apparatus) is no more ensured. The switching device 41 of solid-state type is commanded to turn on while the switching device 42 is maintained in an off-state and it is turn-on later than the switching device 41. As an alternative, both the switching devices 41, 42 of solid-state type are commanded to turn on simultaneously. A short-circuit current initially flows along the second semiconductor branch 4.

When only the third witching device 41 is turned on, the current flows along the second electronic circuit 49 and the third switching device 41 (current limiting mode). After a first predefined time interval (necessary to identify the short-circuit condition), the third switching device 41 is commanded to turn off. The current is forced to circulate along the first electronic circuits 48 until extinction. When both the third and fourth switching devices 41, 42 are turned on simultaneously, the current flows along both these switching devices. After a first predefined time interval, the third switching device 41 is commanded to turn off, whereas the fourth switching device 42 may be turned off or maintained in on-state. The current is forced to circulate along the first electronic circuits 48 until extinction. The second switching device 32 of electromechanical type is not commanded to carry out a closing maneuver and it remains in an open state. Subsequently, the disconnector 150 is commanded to carry out an opening maneuver, thereby providing a galvanic insulation for the grid portion including the switching apparatus.

It is evident from the above that the switching apparatus 1, when arranged according to the embodiment of FIG. 2, can operate in three distinct states: a closed state (normal operation), an open state, in which it blocks the current commuted from the first electric branch 3 to the second electric branch 4, or in a current limiting mode (transient condition), in which it limits the current commuted from the first electric branch 3 to the second electric branch 4.

It is additionally evidenced how the switching group 110 formed by the switching apparatus 1 and the disconnector 150 electrically connected in series can operate according to different states: a closed state, in which the switching apparatus 1 is in a closed state and the disconnector 150 is in a closed state, an open state, in which the switching apparatus 1 is in an open state and the disconnector 150 is in an open state, or a current limiting mode, in which the switching apparatus 1 is in a current limiting mode and the disconnector 150 is in a closed state.

According to some embodiments of the disclosure (FIGS. 1-2), the switching apparatus 1 includes to a control unit 90 (which may be of known type) comprising one or more control logics configured to control the operation of the switching device 30 or the second switching device 32 of electromechanical type and the operation of the first and second switching devices 41, 42 of solid-state type.

Preferably, the control unit 90 is capable of controlling also the operation of the disconnector 150. The control unit 90 is adapted to receive sensing signals S from one or more sensors 93 arranged in suitable positions of the switching apparatus to monitor the behaviour of the current and/or other physical quantities along the first electric branch 3 and the second electric branch 4.

The control unit 90 is adapted to process the sensing signals S provided by the above-mentioned sensors 93 and to provide control signals C to operate switching device 30 or the second switching device 32 of electromechanical type, the first and second switching devices 41, 42 of solid-state type and, possibly, the disconnector 150 according to the operation modes described above. The control unit 90 may execute suitable data processing algorithms to process the information provided by the sensors 93 and check whether certain operating criteria for operating the switching devices 30, 32, 41, 42 and, possibly, 150 are satisfied. The control unit 90 may provide control signals to operate the switching device 30, 32, 41, 42 and, possibly, 150 when an operator manually requests an operation to be carried out or an external request for operation is sent to the switching apparatus. According to variant embodiments of the disclosure (not shown), the control unit 90 is not arranged on board the switching apparatus 1.

As an example, it may be arranged on board a digital relay operatively associated to the switching apparatus or on board another switching apparatus or on board a remote computerized platform. In this case, the switching apparatus 1 may include communication interfaces for communicating with the control unit 90.

FIGS. 3-7A show variant embodiments of the disclosure, in which the switching apparatus 1 is capable of controlling bi-directional currents. These solutions may be particularly advantageous when the switching apparatus is installed in AC electric grids.

FIG. 3 shows a variant solution of the embodiment shown in FIG. 1.

According to this embodiment, the second electric branch 4 comprises a first bridge circuit 45 operatively associated to the current blocking circuit 40A and a second bridge circuit 46 operatively associated with the current limitation circuit 40. The operation of this embodiment of the disclosure is the same as described above for the embodiment of FIG. 1.

Figure 2:
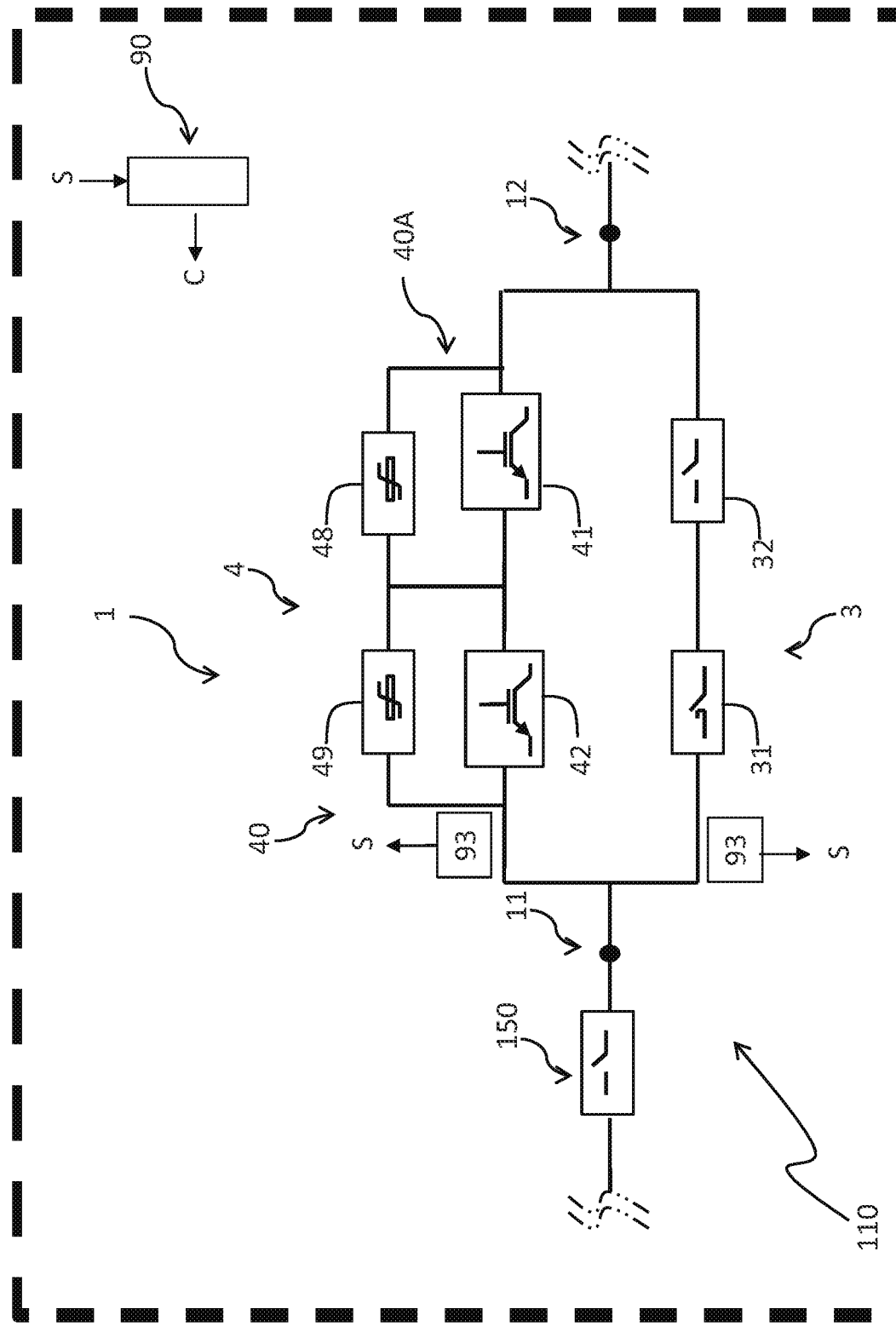
Figure 4:
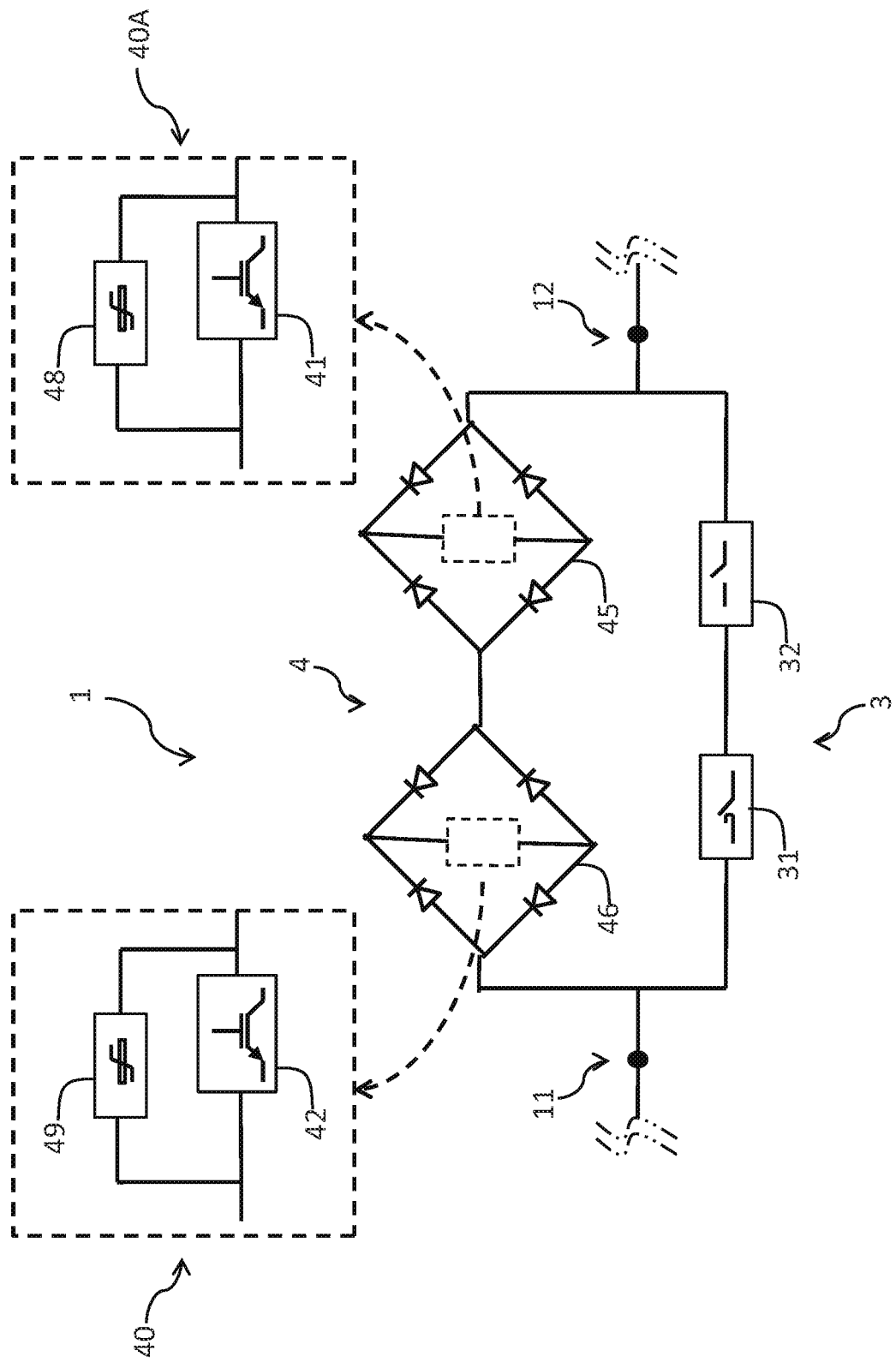

FIG. 4 shows a variant solution of the embodiment shown in FIG. 2. Also in this embodiment, the second electric branch 4 comprises a first bridge circuit 45 operatively associated to the current blocking circuit 40A and a second bridge circuit 46 operatively associated with the current limitation circuit 40. The operation of this embodiment of the disclosure is the same as described above for the embodiment of FIG. 2.

Figure 3:
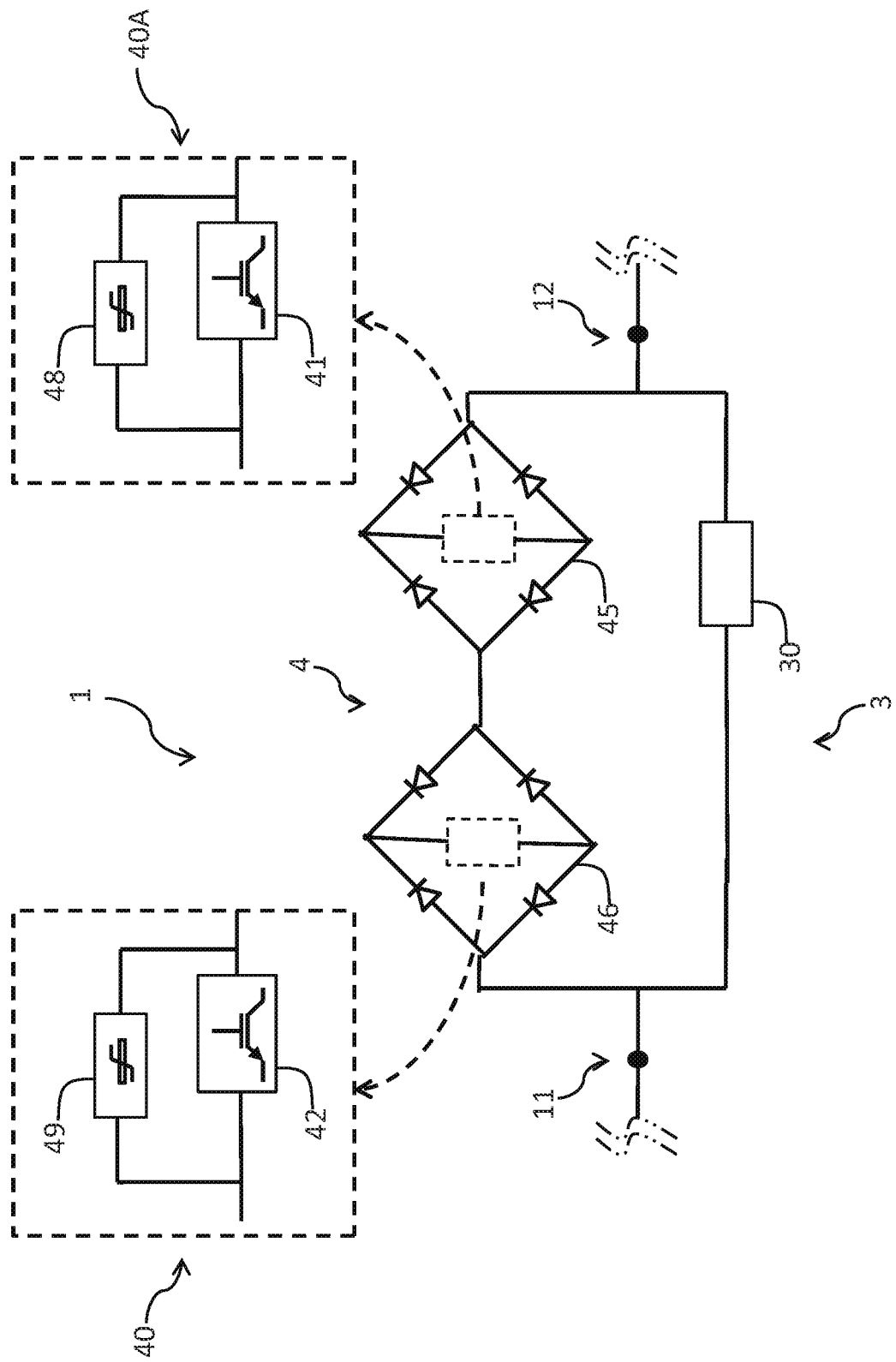

FIG. 5 shows a variant solution of the embodiment shown in FIG. 3. According to this embodiment, the second electric branch 4 comprises a third bridge circuit 47 operatively associated with the remaining components of the second electric branch, for example the series circuit formed by the current limiting circuit 40 and the current blocking circuit 40A. The operation of these embodiments of the disclosure is the same as described above for the embodiments of FIG. 1.

Figure 5A:
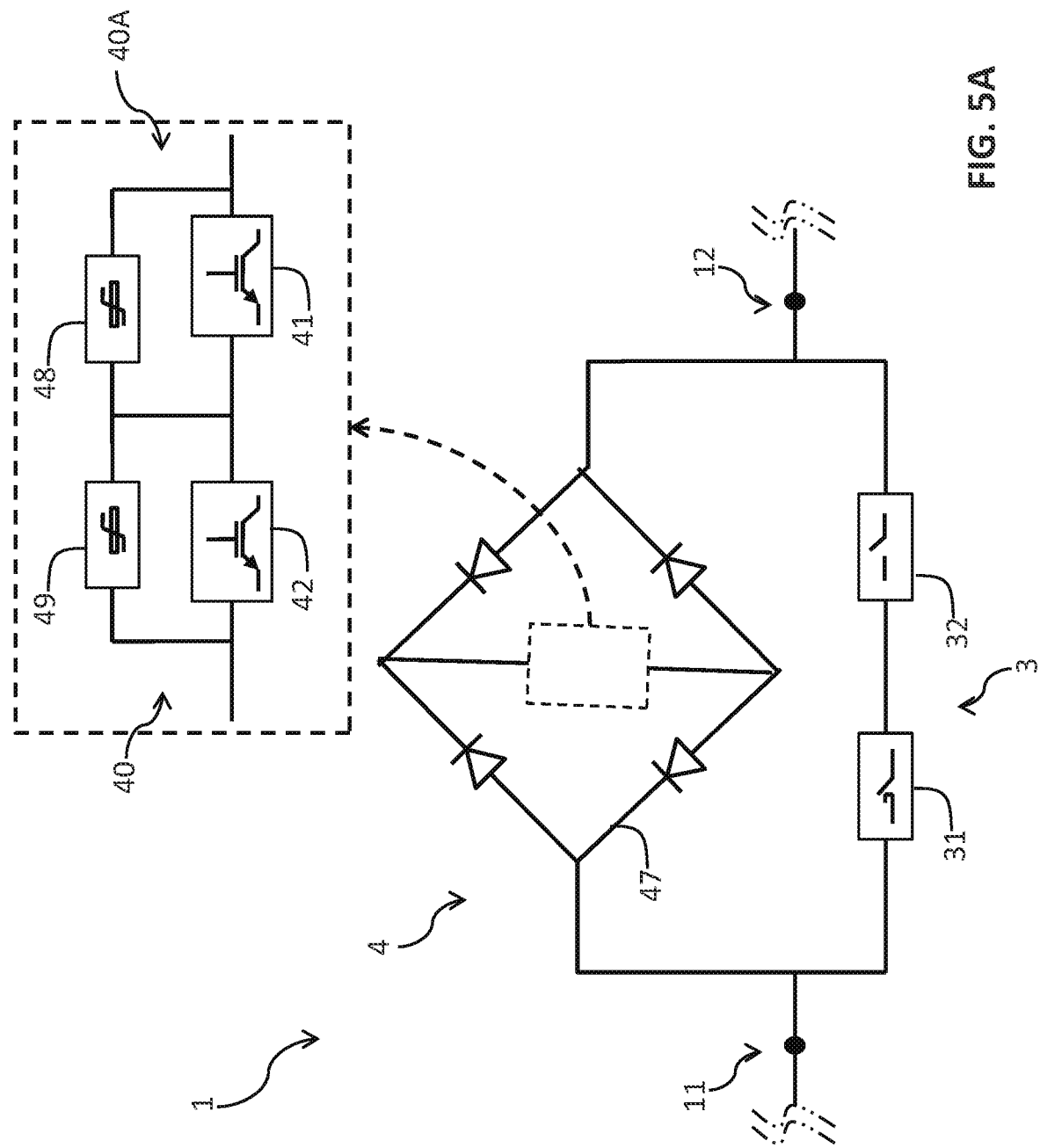

FIG. 5A shows a variant solution of the embodiment shown in FIG. 4. Also in this case, the second electric branch 4 comprises a third bridge circuit 47 operatively associated with the remaining components of the second electric branch, for example the series circuit formed by the current limiting circuit 40 and the current blocking circuit 40A. The operation of these embodiments of the disclosure is the same as described above for the embodiments of FIG. 2. Preferably, in the embodiments illustrated in FIGS. 3-5A, each bridge circuit 45, 46, 47 includes a plurality of diodes arranged according to a Graetz-bridge configuration.

Figure 1:
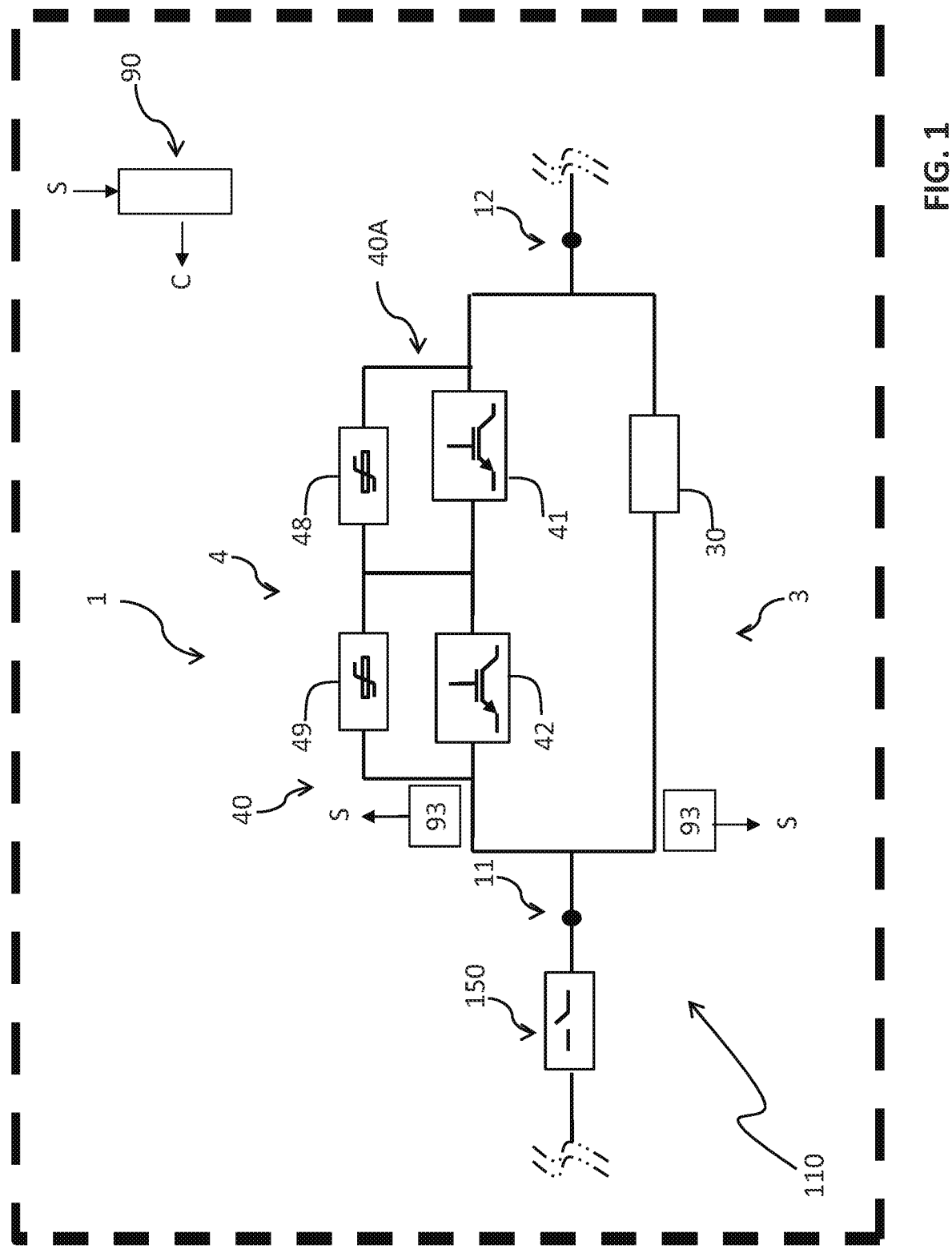
Figure 6:
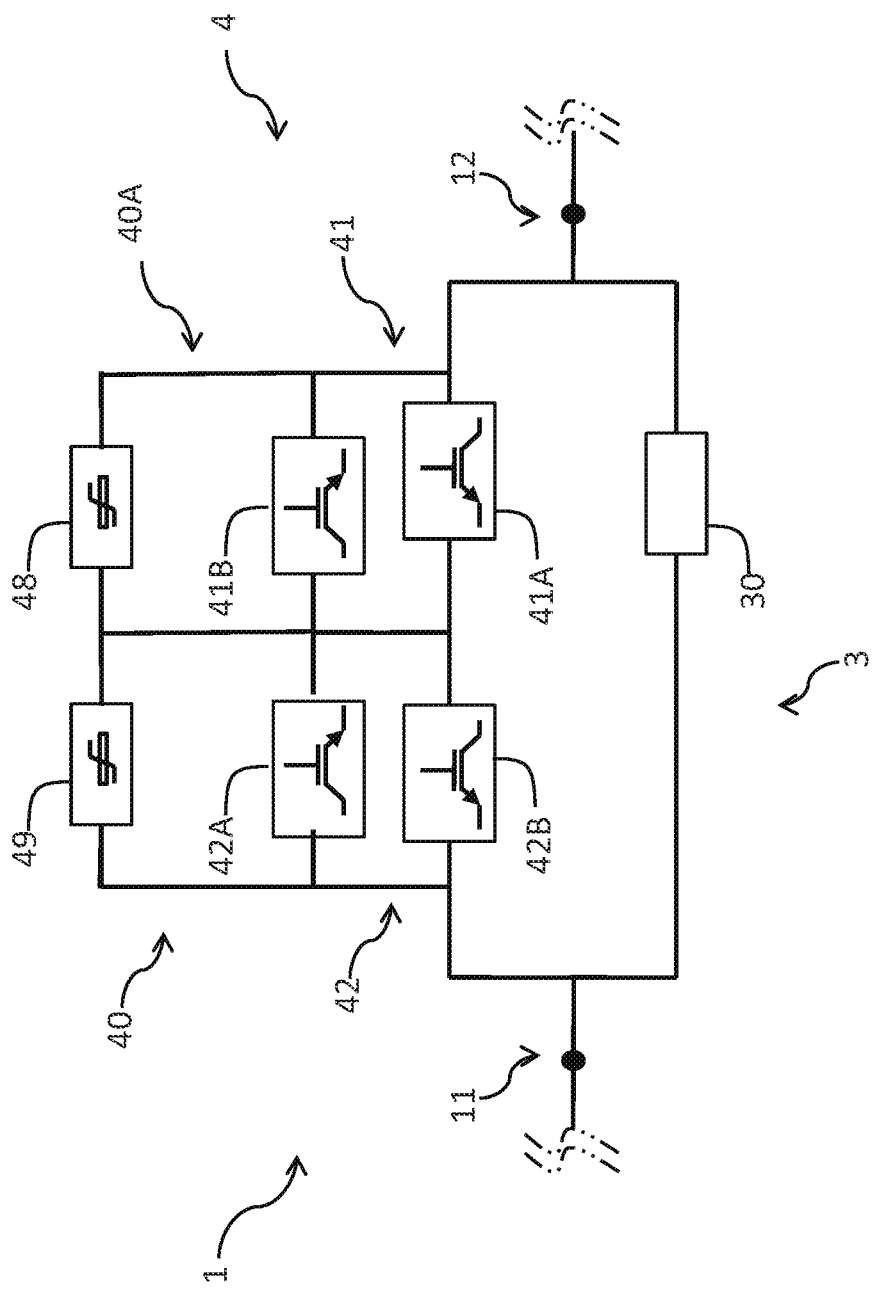

FIG. 6 shows an additional variant solution of the embodiment shown in FIG. 1. According to this embodiment, both the current interruption circuit 40A and the current limiting circuit 40 comprise pairs of semiconductor switching components 41A, 41B and 42A, 42B, which are mutually connected in anti-parallel configuration. For this configuration, each semiconductor switching component must either be of the reverse blocking type or arranged in series to a diode. Both the semiconductor switching components 41A, 41B are electrically connected in parallel to the first electronic circuit 48 while both the semiconductor switching components 42A, 42B are electrically in parallel to the second electronic circuit 49. The operation of this embodiment of the disclosure is the same as described above for the embodiment of FIG. 1.

According to further variant embodiment (not shown) of the disclosure, both the first and second switching devices 41, 42 of solid-state type may include corresponding pairs of semiconductor switching components, which are mutually connected according to an anti-series configuration. For this configuration, each semiconductor switching component must be either of the reverse conducting type or arranged in parallel to a diode.

Figure 7:
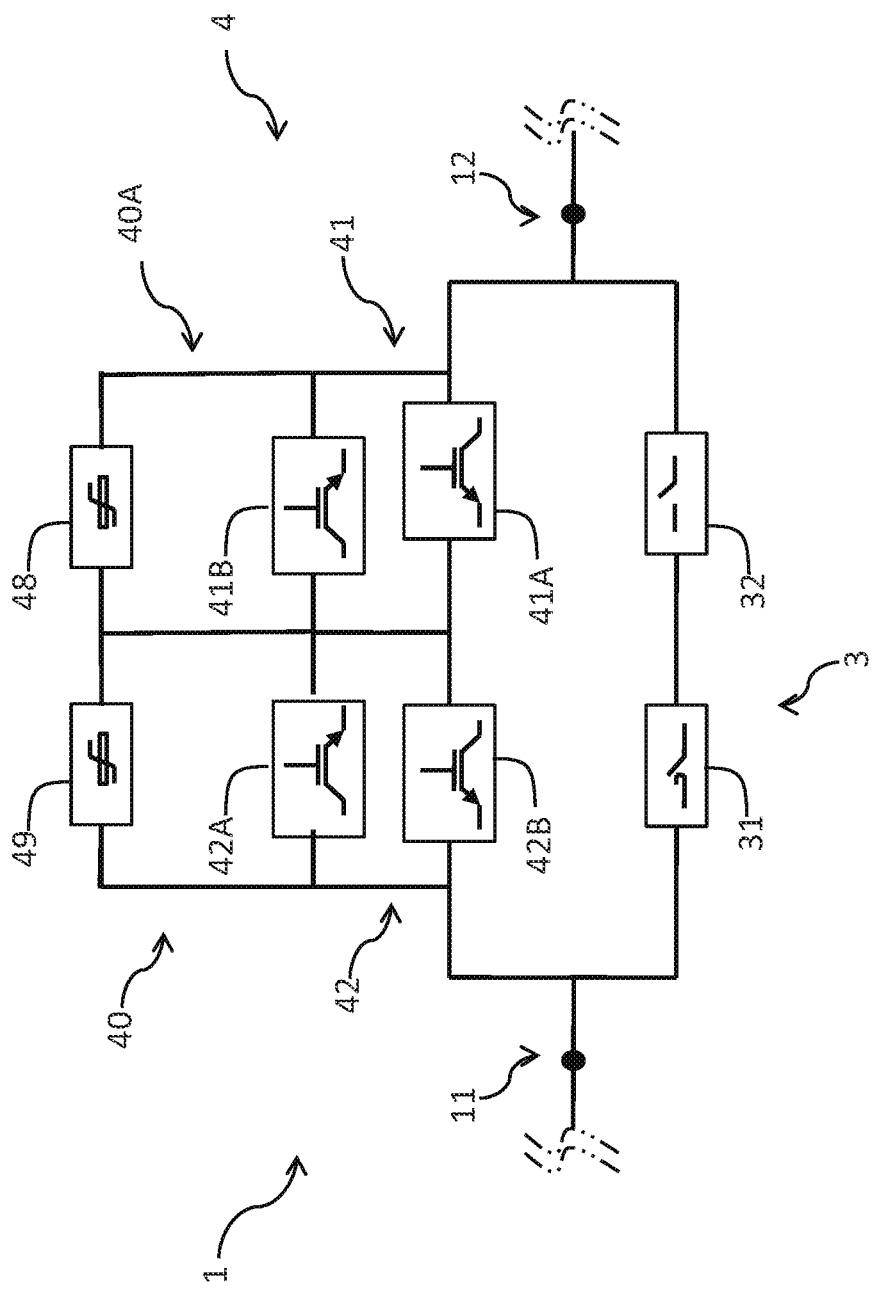

FIG. 7 shows an additional variant solution of the embodiment shown in FIG. 2. Also in this case, both the current interruption circuit 40A and the current limiting circuit 40 comprise pairs of semiconductor switching components 41A, 41B and 42A, 42B, which are mutually connected in anti-parallel configuration. For this configuration, each semiconductor switching component must either be of the reverse blocking type or arranged in series to a diode. Both the semiconductor switching components 41A, 41B are electrically connected in parallel to the first electronic circuit 48 while both the semiconductor switching components 42A, 42B are electrically in parallel to the second electronic circuit 49. The operation of this embodiment of the disclosure is the same as described above for the embodiment of FIG. 2.

According to further variant embodiment (not shown) of the disclosure, both the first and second switching devices 41, 42 of solid-state type may include corresponding pairs of semiconductor switching components, which are mutually connected according to an anti-series configuration. For this configuration, each semiconductor switching component must be either of the reverse conducting type or arranged in parallel to a diode.

Figure 8:
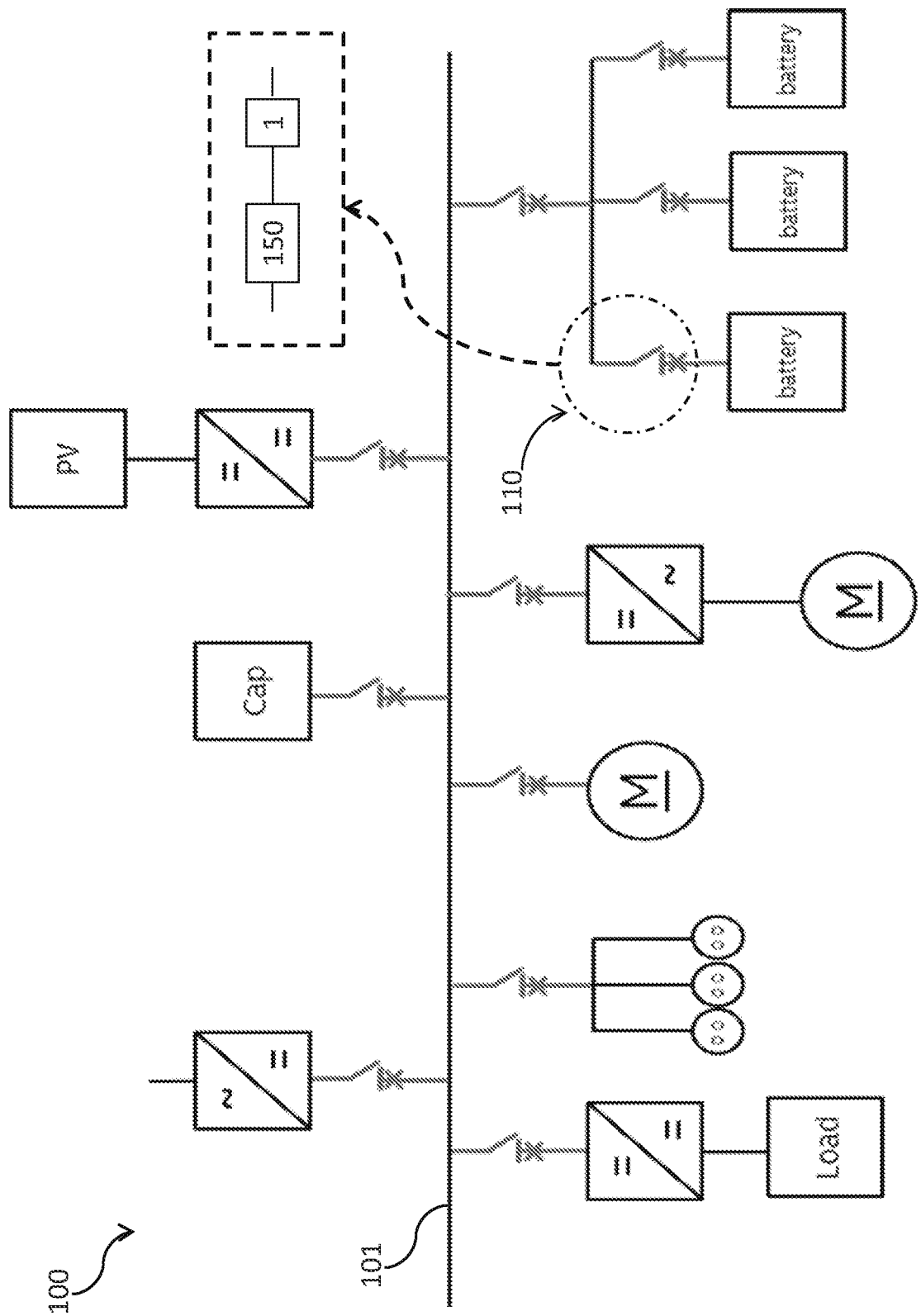

FIG. 8 shows an example of DC electric grid 100. The DC electric grid comprises a DC-bus 101 (DC-link) and a plurality of components electrically connected to said DC bus. Some components may be formed by electric loads or apparatuses (e.g., electric motors) that need to be electrically fed.

Other components may be formed by energy storage apparatuses (e.g., capacitor banks or batteries) or power generating apparatuses (e.g., photovoltaic plants), which are therefore capable of providing electric energy.

In the DC electric grid 100, a number of switching apparatuses, according to the disclosure, are suitably adopted to manage the electrical connection of the above-mentioned components with the DC electric bus.

Conveniently, as illustrated above, each switching apparatus 1 is electrically connected in series with a disconnector 150 to form a switching group 110.

From the above-mentioned figure, it is evident that DC currents circulating through the components linked to the DC-bus can be bi-directional.

In case of electric faults, many components of the DC electric grid can provide a contribution to possible short-circuit currents, since reverse currents may flow along them. In a worst case, if the electric fault occurs on the DC-bus, many components can directly feed the electric fault.

The adoption of the switching apparatus, according to the disclosure, in the DC electric grid allow fast reacting to possible electric faults and implementing suitable protection and selectivity functionalities to manage possible electric faults.

Additionally, efficient strategies to manage and coordinate circuit protection interventions along different branches of the electric grid can be implemented.

FIGS. 9-16 show some examples of strategies that can be implemented to manage an electric fault in a simplified DC electric grid 100A.

The DC electric grid 100A comprises a Battery Energy Storage System (BESS), in which a group of battery units is electrically connected to a power converter (not shown) through a DC-bus 101A.

Each battery unit is electrically connected to or disconnected from the DC-bus 101A by means of a switching group 110.

Each switching group 110 includes a switching apparatus 1, according to the disclosure, capable of conducting bi-directional currents and a disconnector 150 electrically connected in series.

The DC-bus 101A is electrically connected to or disconnected from the above-mentioned power converter through a circuit breaker 160, e.g., of electromechanical type.

As an alternative, the DC-bus 101A may be electrically connected to or disconnected from the above-mentioned power converter by means of an additional switching group including a switching apparatus of the disclosure in the embodiment of FIG. 2 and capable of conducting bi-directional currents.

As illustrated above, since it includes a switching apparatus of the disclosure, each switching group 110 can operate in the following states: a closed state, in which the switching apparatus 1 is in a closed state and the disconnector 150 is in a closed state, an open state, in which the switching apparatus 1 is in an open state and the disconnector 150 is in an open state, and a current limiting mode, in which the switching apparatus 1 is in a current limiting mode and the disconnector 150 is in a closed state.

When it is in a closed state, each switching group 110 conducts a current, thereby electrically connecting the corresponding battery unit with the DC-bus.

When it is in an open state, each switching group 110 blocks a current, thereby electrically disconnecting the corresponding battery unit from the DC-bus.

When it is in a current limiting mode, each switching group 110 provides current limiting functionalities, thereby limiting the current circulating between the corresponding battery unit and the DC-bus.

When a circuit breaker 160 is used to electrically connect or disconnect the power converter to or from the DC-bus 101A, said circuit breaker can switch in a closed state, at which it conducts a current and therefore it electrically connects the power converter to the DC-bus, or in an open state, at which it blocks a current and therefore it electrically disconnects the power converter from the DC-bus.

When an additional switching group including a switching apparatus of the disclosure, capable of conducting bi-directional currents, is used in place of the circuit breaker 160, said switching group behaves as described above, thus electrically connecting the power converter to the DC-bus, when it is in a closed state, electrically disconnecting the power converter from the DC-bus, when it is in an open state, or limiting the current circulating between the power converter and the DC-bus, when it is in a current limiting mode.

Figure 9:
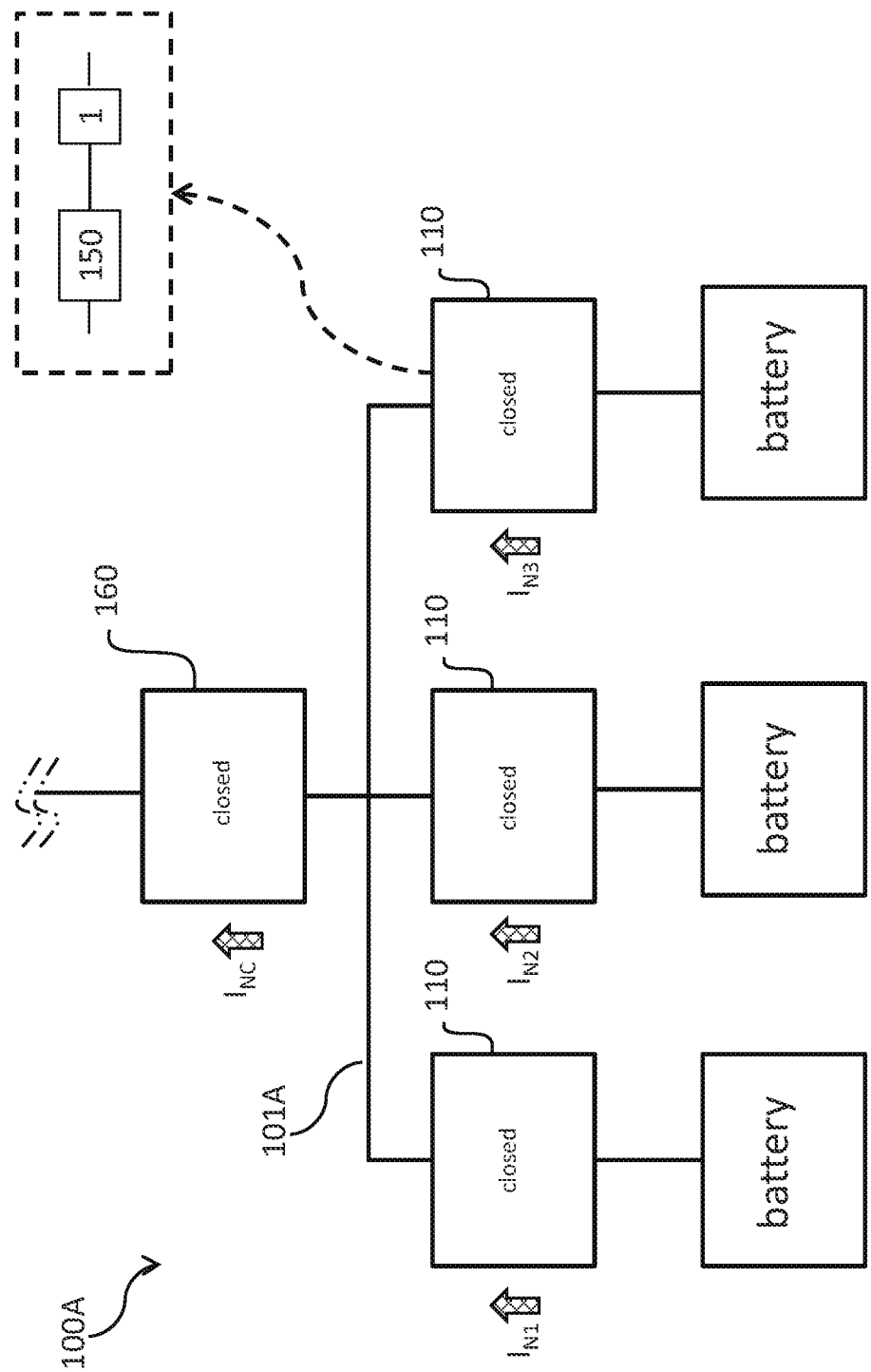

Normal operation: FIG. 9 schematically shows the operation of the electric grid 100A in normal conditions. In this situation, the circuit breaker 160 is in a closed state and each switching group 110 is in a closed state (normal operation). If an additional switching group was used in place of the circuit breaker 160, such a switching group would be in a closed state. Currents IN1, IN2, IN3 circulate along the above-mentioned battery units while a current INC flows along the electronic converter. The current INC is substantially the sum of the currents IN1, IN2, IN3. All the currents IN1, IN2, IN3, INC flowing from/to the battery units and the electronic converter take values not exceeding the nominal current foreseen for said battery units and have a same direction, which basically depends on the operating mode (charging or discharging) of the battery units.

In the example of FIG. 9, the battery units are supposed to be in a discharging mode. Currents IN1, IN2, IN3, INC would have an opposite direction if the battery units were operating in a charging mode. The operation of the electric grid would however be substantially the same.

Figure 10:
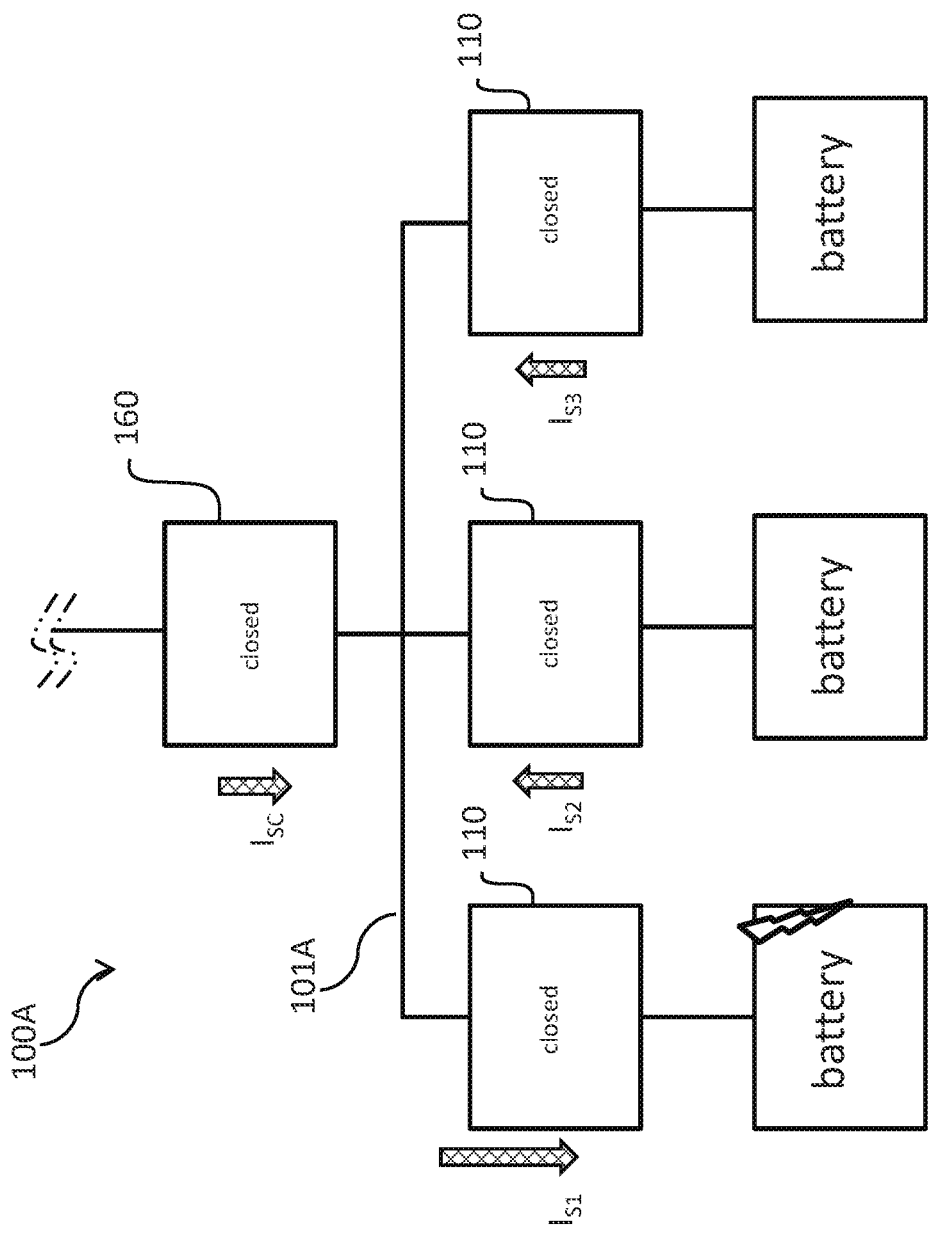

Short circuit in a battery unit: FIG. 10 schematically shows a situation, in which a short-circuit occurs in a battery unit. A short-circuit current IS1 flows to the battery unit affected by the electric fault. The electric fault is fed by short-circuit currents IS2, IS3 flowing from the other battery units and by a short-circuit current ISC flowing through the power converter. The short-circuit current ISC flowing through the power converter has a reverse direction with respect to the corresponding current INC as the power converter is in a discharging mode.

Figure 11:
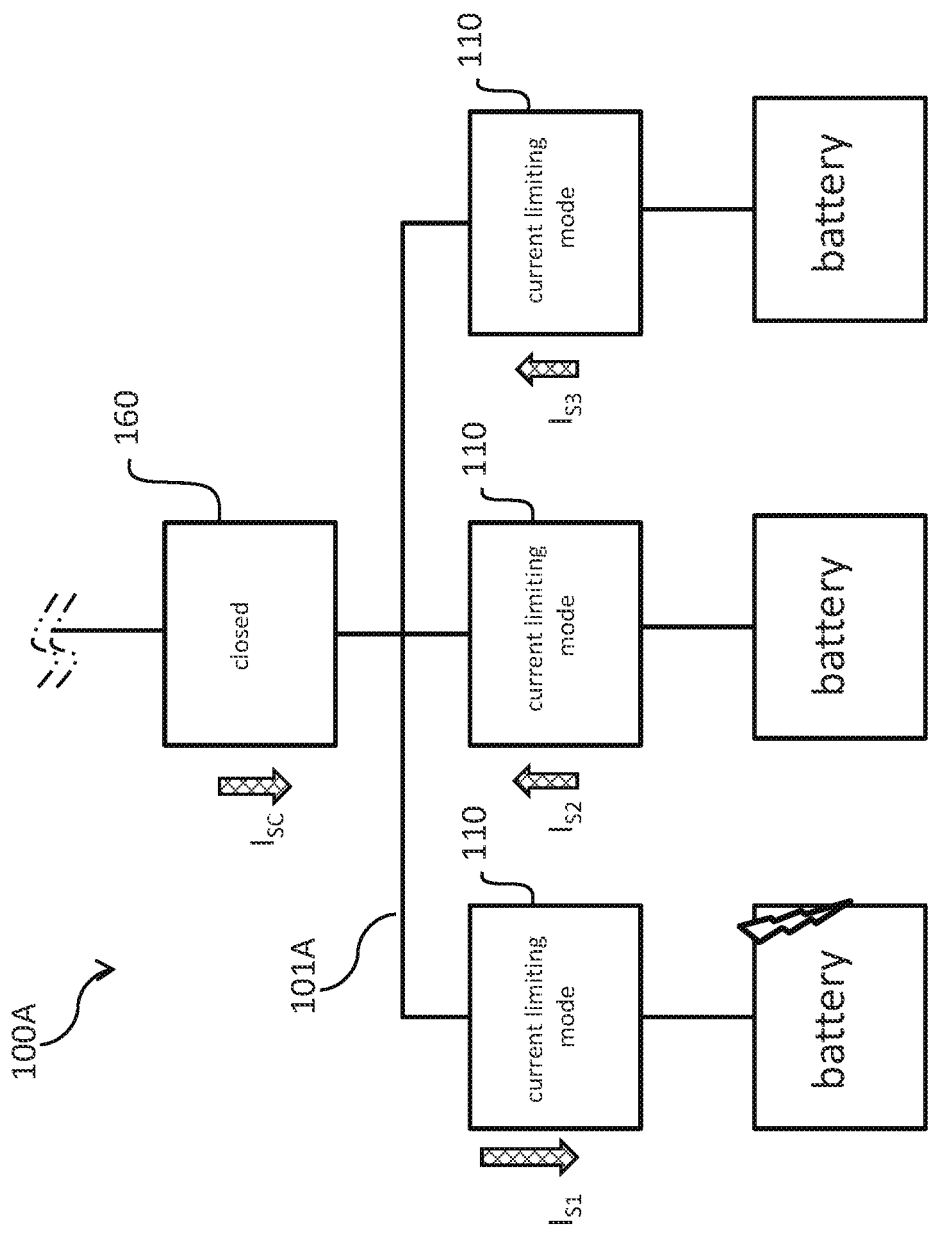

As illustrated in FIG. 11, as soon as short-circuit currents ISC, IS1, IS2, IS3 flow in the electric grid 100A, the switching groups 110 operatively associated to the battery units switch to a current limiting mode. The circuit breaker 160 is maintained in a closed state to wait for a possible clearance of the electric fault.

If an additional switching group was used in place of the circuit breaker 160, such a switching group would switch in a current limiting mode as well. The result of the intervention of the switching groups 110 is a limitation of the short-circuit current IS1 feeding the electric fault. Subsequently, since short-circuit currents ISC, IS1, IS2, IS3 keep on circulating in the electric grid 100, the switching group 110, which is closest to the battery unit affected by the electric fault, switches in an open state.

In fact, the switching group 110, which is closest to the battery unit affected by the electric fault, can remain in a current limiting mode for a shorter time with respect to the other switching groups, since such a switching group is affected by a short-circuit current having a larger magnitude.

As the corresponding switching group 110 has switched in an open state, the battery unit affected by the electric fault is electrically insulated from the remaining parts of electric grid.

Figure 12:
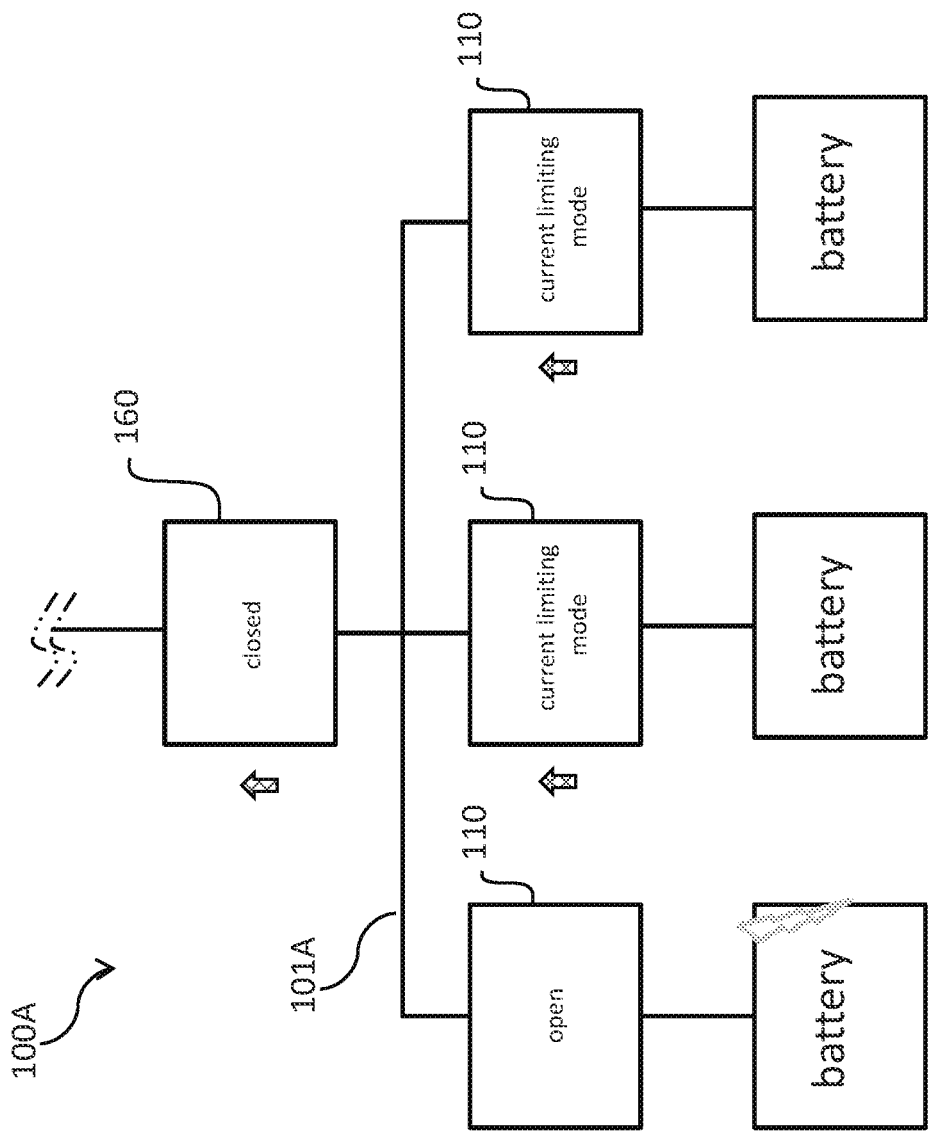

In this situation, the switching groups 110 operatively associated to the other battery units remain in a current limiting mode and relatively small currents (e.g. having values even lower than the nominal value) will circulate through said switching groups (FIG. 12). The circuit breaker 160 is still maintained in a closed state.

Figure 13:
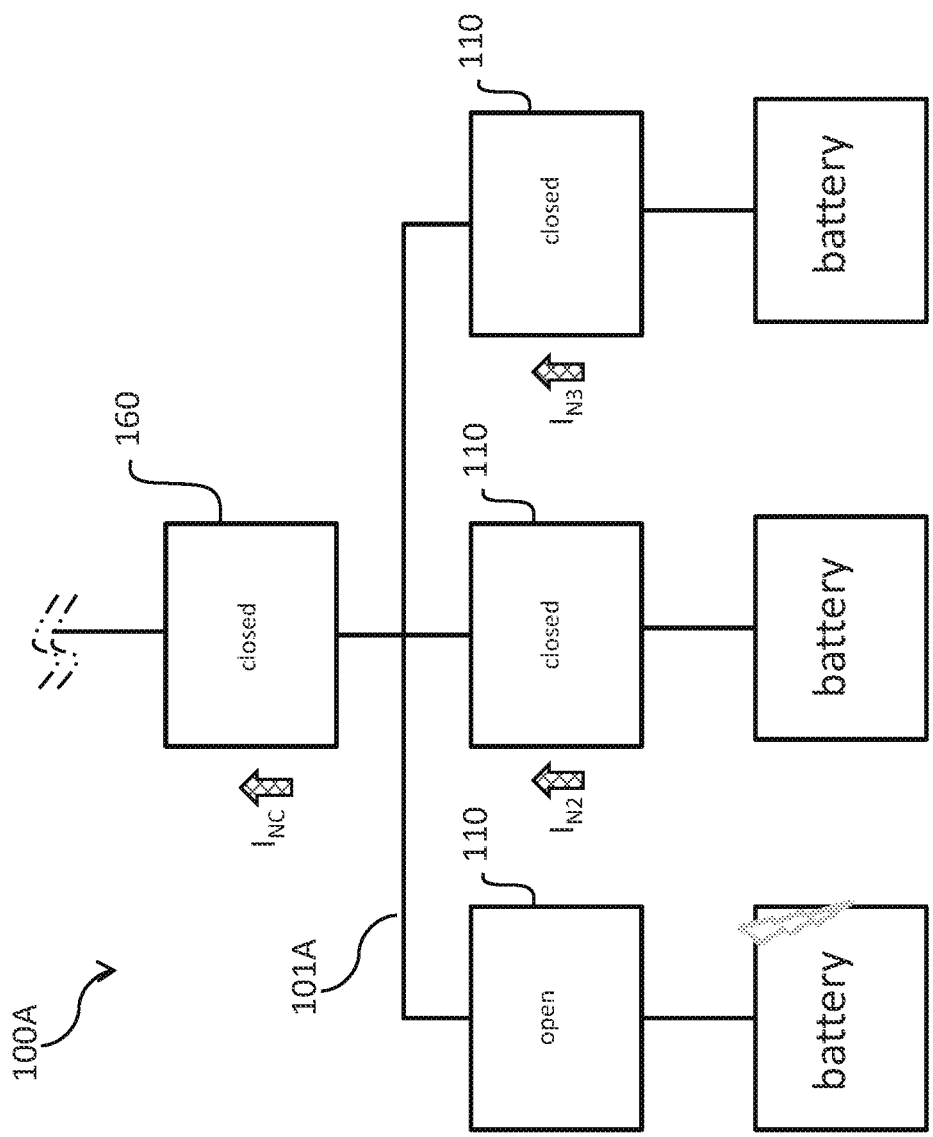

Finally, since the electric fault has been cleared by operating a switching group 110 in an open state, the switching groups 110 operatively associated to the battery units not affected by the electric fault can switch back to a closed state and operate again in normal conditions (FIG. 13).

If an additional switching group was used in place of the circuit breaker 160, such a switching group would switch in a closed state as well.

Currents circulating in the electric grid 100 take again normal values INC, IN2, IN3 and a same direction. Obviously, the battery unit affected by the electric fault remains galvanically insulated from the remaining parts of electric grid 100A. Obviously, the current INC flowing along the power converter is reduced accordingly.

The operation of the electric grid would be substantially the same, if the battery units were operating in a charging mode.

Figure 14:
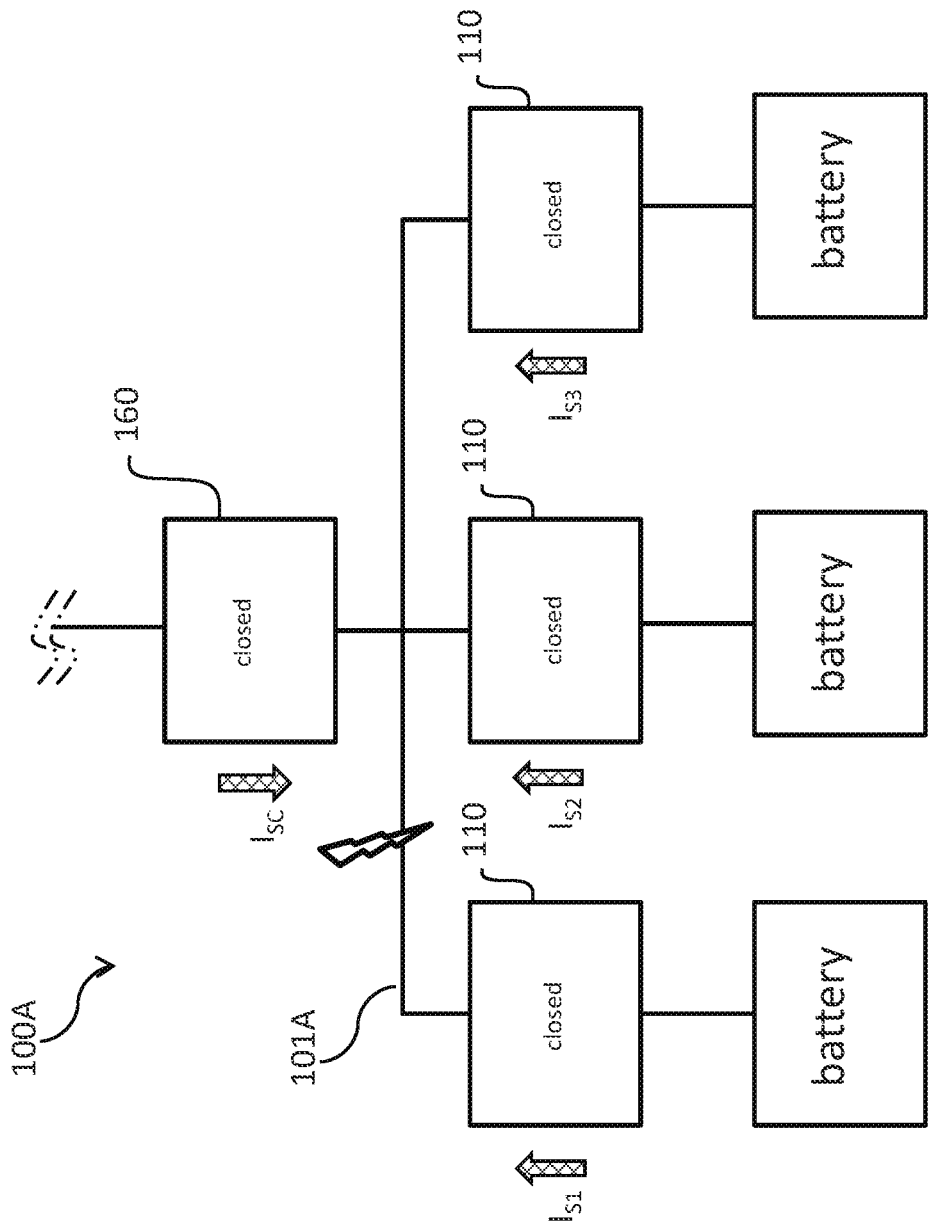

Short circuit in the DC-bus: FIG. 14 schematically shows a situation, in which a short-circuit occurs in the DC-bus 101A. Short-circuit currents ISC, IS1, IS2, IS3 flow along the battery units and the electronic converter to feed the electric fault. Also in this case, the short-circuit current ISC flowing through the power converter has a reverse direction with respect to the corresponding current INC as the power converter in discharging mode. Since the electric fault is located in the DC-bus, short-circuit currents IS1, IS2, IS3 flowing along the battery units will have a same direction, which is opposite to the short-circuit current ISC flowing through the power converter.

Figure 15:
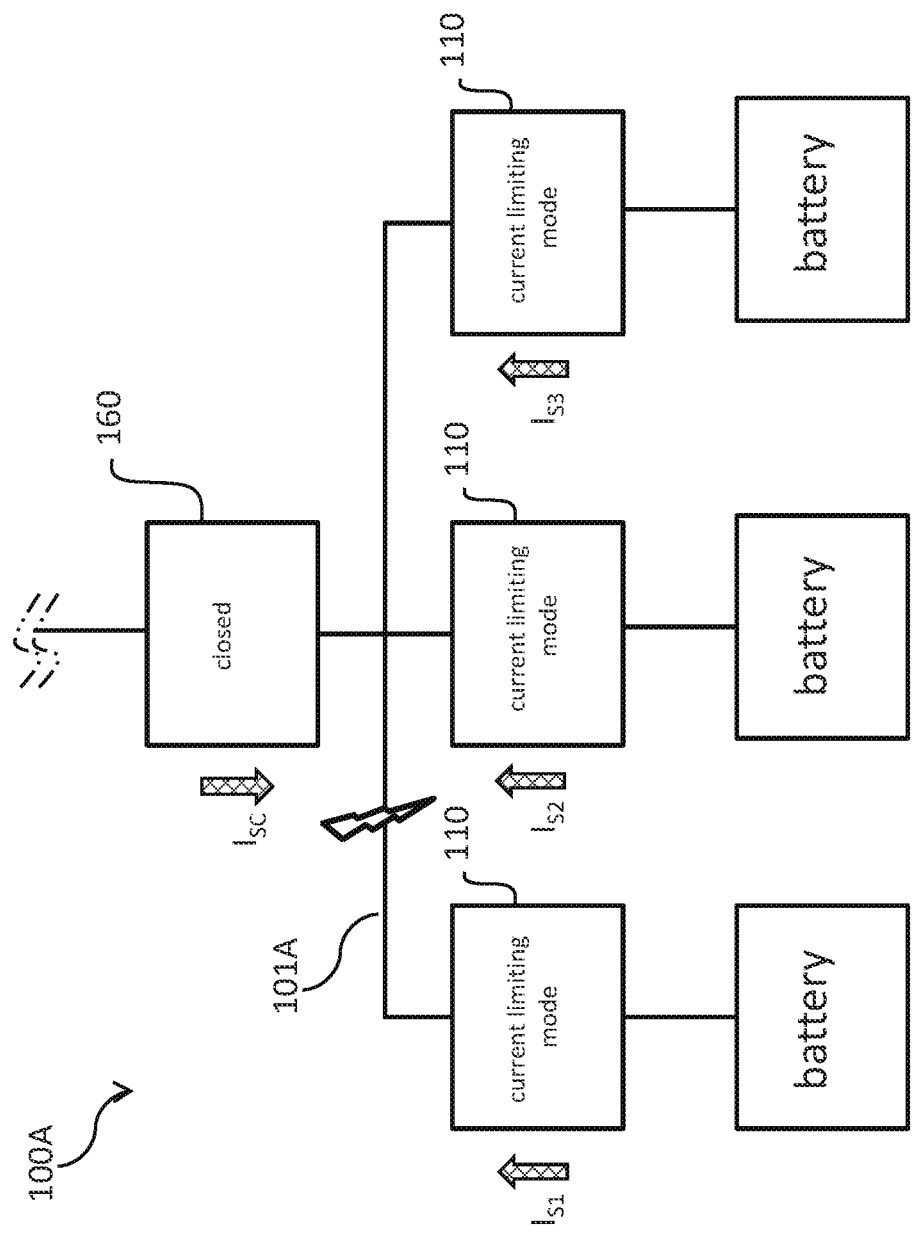

As illustrated in FIG. 15, as soon as short-circuit currents ISC, IS1, IS2, IS3 circulate in the electric grid 100, the switching groups 110 operatively associated to the battery units switch in a current limiting mode. The circuit breaker 160 is temporarily maintained in a closed state to wait for a possible a clearance of the electric fault. If a switching group 110 was used in place of the circuit breaker 160, such a switching group would operate in a current limiting mode as well. Since it is located in the DC-bus, the electric fault cannot be cleared by operating a single switching group 110 (the closest to the electric fault) in an open state. As the fault has not been cleared, after the above-mentioned first time interval has passed, all the switching groups 110 and the circuit breaker 160 are thus switched to an open state. If an additional switching group was used in place of the circuit breaker 160, such a switching group would switch in an open state as well.

Figure 16:
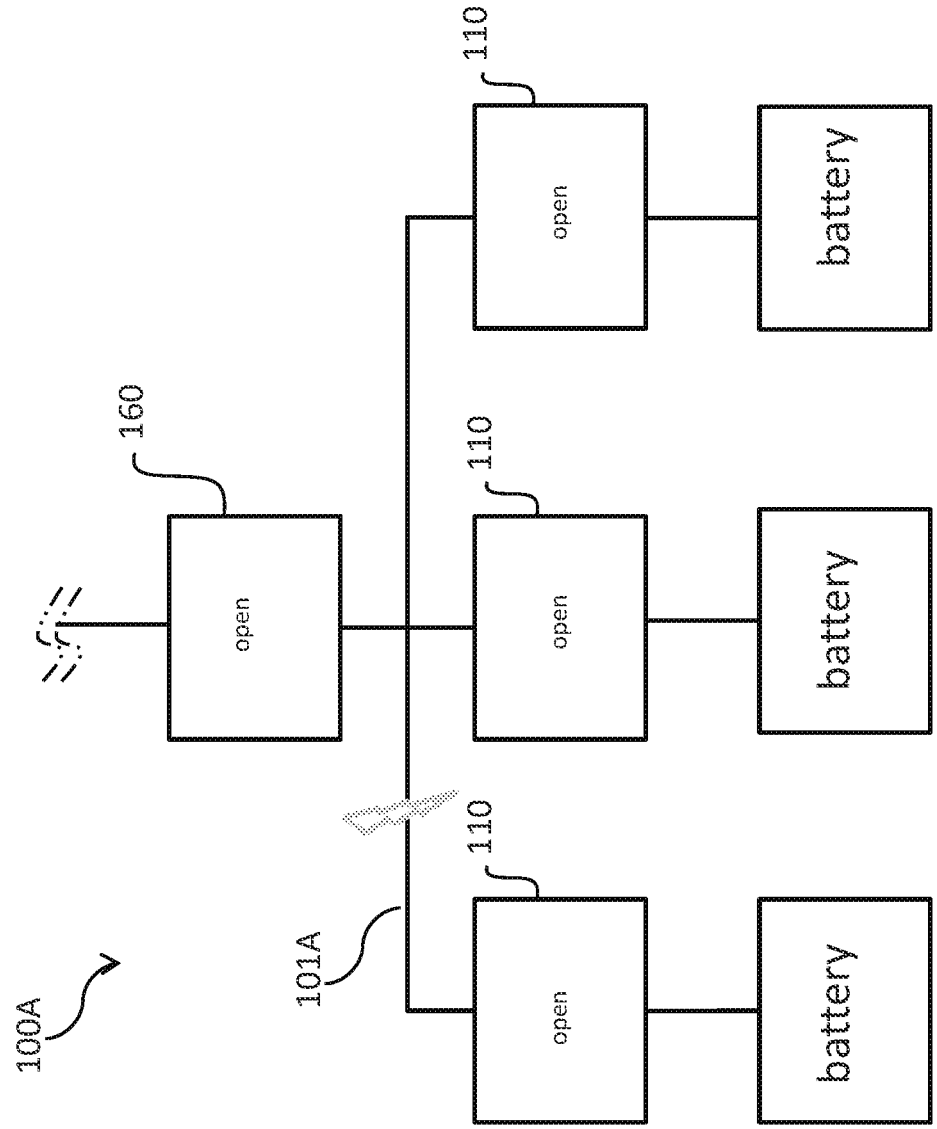

As a result of the above, the whole DC electric grid 100 is shut down (FIG. 16). The operation of the electric grid would substantially be the same, if the battery units were operating in a charging mode.

It is evidenced that an electric grid of different type (for example of AC type), generically comprising a plurality of switching groups 110 (configured as described above) for electrically connecting or disconnecting different grid portions of said electric grid, would substantially operate, mutatis mutandis, as the DC electric grid 100A described above.

Therefore, it is apparent how, in a further aspect, the present disclosure relates to a method for operating an electric grid including a plurality of switching groups 110 (configured as described above) for electrically connecting or disconnecting different grid portions of said electric grid.

The method, according to the disclosure, comprises the step of switching the switching groups 110 in a current limiting mode, if there is an electric fault (namely a short circuit) in the electric grid.

The method of the disclosure, then comprises the step of switching the switching group 110, which is closest to said electric fault, in an open state and maintaining the remaining switching groups of said electric grid in a current limiting mode.

In fact, the switching group 110, which is closest to the electric fault, can remain in a current limiting mode for a shorter time with respect to the other switching groups, since such a switching group is affected by a short-circuit current having a larger magnitude.

If said electric fault is electrically isolated within a predefined period of time (which basically coincides with the above-mentioned first time interval) by operating the switching group 110, which is closest to said electric fault, the method of the disclosure comprises the step of maintaining the switching group 110, which is closest to said electric fault, in an open state and switching the remaining switching groups 110 of said electric grid back to the closed state.

If said electric fault is not electrically isolated within said predefined period of time by operating the switching group 110, which is closest to said electric fault, the method of the disclosure comprises the step of switching all the switching groups 110 of said electric grid in an open state.

As illustrated in the above examples of FIGS. 9-16, the method of the disclosure is particularly adapted for protecting a DC electric grid 100A comprising a battery energy storage system including a plurality of battery units, a DC-bus 101A for electrically connecting said battery units to a power converter and a plurality of switching groups 110

(configured a described above) for electrically connecting or disconnecting said battery units to or from said DC-bus.

In this case, the method, according to the disclosure, comprises the step of switching the switching groups 110 in a current limiting mode, if there is an electric fault (namely a short circuit) in the energy battery storage system.

When the DC-bus 101A is electrically connected to or disconnected from the above-mentioned power converter through a circuit breaker 160, e.g. of electromechanical type, the method of the disclosure further comprises the step of maintaining the circuit breaker 160 in a closed state.

When the DC-bus 101A is electrically connected to or disconnected from the above-mentioned power converter through an additional switching group (similar to the switching groups 110), the method of the disclosure further comprises the step of switching said additional switching group in a current limiting mode.

The method, according to the disclosure, comprises the step of switching the switching group 110, which is closest to the electric fault, in an open state and maintaining the remaining switching groups 110 of the energy storage system in a current limiting mode.

If the electric fault is electrically isolated within a predefined period of time (the above-mentioned first time interval) by switching the closest switching group 110 in an open state, the method of the disclosure comprises the step of maintaining the switching group 110, which is closest to the electric fault, in an open state and switching the remaining switching groups 110 of the battery energy storage system back to the closed state.

When the DC-bus 101A is electrically connected to or disconnected from the above-mentioned power converter through a circuit breaker 160, e.g. of electromechanical type, the method of the disclosure further comprises the step of maintaining the circuit breaker 160 in a closed state.

When the DC-bus 101A is electrically connected to or disconnected from the above-mentioned power converter through an additional switching group (similar to the switching groups 110), the method of the disclosure further comprises the step of switching said additional switching group in a closed state.

If the electric fault cannot be electrically isolated within said predefined period of time by operating the switching group 110, which is closest to the electric fault, in an open state, the method, according to the disclosure, comprises the step of switching all the switching groups 110 of the battery energy storage system in an open state.

When the DC-bus 101A is electrically connected to or disconnected from the above-mentioned power converter through a circuit breaker 160, e.g. of electromechanical type, or by an additional switching group (similar to the switching groups 110), the method of the disclosure further comprises the step of switching the circuit breaker 160 or said additional switching group in an open state.

The method of the disclosure allows managing an electric fault (namely a short-circuit) in an electric grid in a selective manner depending on whether said electric fault can be electrically isolated or not.

The method of the disclosure initially provides for limiting the fault currents circulating along the various portions of the electric grid.

If the electric fault can be cleared within a predefined period of time by operating a specific switching group 110 (the closest to the short-circuit) in an open state, the method of the disclosure provides for bringing back in normal conduction mode the portions of the electric grid, which are not involved in the electric fault.

If the electric fault cannot be cleared within said predefined period of time by operating said specific switching group 110 in an open state, the method of the disclosure provides for shutting down the electric grid.

The method allows improving the flexibility in use of an electric grid. Additionally, it allows reducing possible out of service periods of the electric grid in presence of short-circuits. In practice, the electric grid is shut-down only when strictly necessary, since the electric fault cannot be cleared in any way.

The switching apparatus, according to the disclosure, provides remarkable advantages with respect to similar known solutions of the state of the art.

The switching apparatus 1 may be subject to a number of variants falling within the concept of the claimed invention.

The switching apparatus 1 can be industrially realized as a stand-alone apparatus or as an add-on module, e.g., for each electric pole of a mechanical circuit breaker (MCCB).

According to further variants, the switching apparatus 1 may include additional commutation booster circuits of known type, such as those disclosed in the above-mentioned patent document WO2017/186262.

The switching apparatus, according to the disclosure, allows providing limiting functionalities for the short-circuit currents possibly flowing through the solid-state switching devices.

Additionally, in some embodiments (FIG. 2), the switching apparatus, according to the disclosure, allows carrying out a fast intervention to interrupt possible short-circuit currents when an electric fault occurs in an electric line.

The above-mentioned features allow using solid-state devices of smaller size for a given nominal current. Obviously, this allows remarkably limiting the size and costs of the switching apparatus.

The switching apparatus, according to the disclosure, allows managing in a reliable manner nominal currents and possible overload currents flowing along an electric line.

The switching apparatus, according to the disclosure, allows implementing improved selectivity functionalities by exploiting the improved operating conditions of the on-board solid-state switching devices, particularly when current limiting functionalities are put into practice.

Additionally, it allows implementing efficient strategies to manage and coordinate circuit protection interventions along different branches of the electric grid can be implemented.

The switching apparatus, according to the disclosure, is of relatively easy and cheap industrial production and installation on the field.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A switching apparatus for an electric grid, comprising:
   first and second electric terminals for electrical connection with corresponding grid portions;
   a first electric branch comprising one or more switching devices of electromechanical type, each having electric contacts that can be mechanically coupled or separated to conduct or block a current, respectively;
   a second electric branch comprising a plurality of switching devices of solid-state type, each including one or more switching components based on semiconductor materials and being adapted to switch between an on-state, at which said switching device conducts a current, and an off-state, at which said switching device blocks a current, said second electric branch being electrically connected in parallel with said first electric branch between said first and second electric terminals;
   wherein said second electric branch comprises:
   a current blocking circuit adapted to block a current flowing along said second electric branch, said current blocking circuit including a first switching device of solid-state type and a first electronic circuit electrically connected in parallel to said first switching device of solid-state type;
   a current limiting circuit adapted to limit a current flowing along said second electric branch, said current limiting circuit being electrically connected in series with said current blocking circuit and including a second switching device of solid-state type and a second electronic circuit electrically connected in parallel to said second switching device of solid-state type, and
   wherein said switching apparatus is configured to operate in a closed mode, an open mode based on using said first electronic circuit of said current blocking circuit, and a current limiting mode based on using said second electronic circuit of said current limiting circuit.

2. The switching apparatus according to claim 1, wherein said first electric branch comprises a single switching device of electromechanical type capable of switching between a closed state, at which said switching device conducts a current, and an open state, at which said switching device blocks a current.

3. The switching apparatus according to claim 1, wherein said first electric branch comprises:
   a first switching device of electro-mechanical type capable of switching between a closed state, at which said first switching device of electromechanical type conducts a current, and an open state, at which said first switching device of electromechanical type blocks a current, said first switching device of electromechanical type being a self-acting switching device capable of switching from said closed state to said open state upon being driven by a current flowing along said switching apparatus and without receiving an external control signal or an external power supply, said first switching device of electromechanical type switching from said closed state to said open state, when a current flowing along said switching apparatus exceeds a corresponding predefined threshold value or when a changing rate of a current flowing along said switching apparatus exceeds a corresponding predefined threshold value or upon a combination of these two conditions; and
   a second switching device of electromechanical type electrically connected in series with said first switching device of electro-mechanical type, said second switching device of electromechanical type being capable of switching between a closed state, at which said second switching device of electromechanical type conducts a current, and an open state, at which said second switching device of electromechanical type blocks a current, said second switching device of electromechanical type switching between said closed state and said open state, upon receiving a corresponding input control signal.

4. The switching apparatus according to claim 3, wherein said first switching device of electromechanical type includes a first actuator capable of exploiting electrodynamic forces generated by the flow of a current along said switching apparatus for actuating the electric contacts of said first switching device of electromechanical type, thereby causing said first switching device of electromechanical type to switch from said closed state to said open state.

5. The switching apparatus according to claim 4, wherein said first actuator includes a Thomson coil actuating device operatively coupled to the electric contacts of said first switching device of electromechanical type.

6. The switching apparatus according to claim 3, wherein said first switching device of electromechanical type is adapted to switch from a closed state to an open state, if a short-circuit current flows along said switching apparatus.

7. The switching apparatus according to claim 3, wherein said first switching device of electromechanical type is adapted not to switch from a closed state to an open state, if an overload current or a normal current flows along said switching apparatus.

8. The switching apparatus according to claim 1, wherein said first switching device of solid-state type comprises a pair of switching components based on semiconductor materials arranged according to an anti-parallel or anti-series configuration to allow a control of bi-directional currents flowing along said second electric branch.

9. The switching apparatus according to claim 1, wherein said second electronic branch comprises a first diode bridge operatively associated to said current blocking circuit to allow a control of bi-directional currents flowing along said second electric branch.

10. The switching apparatus according to claim 1, wherein said second switching device of solid-state type comprises a pair of switching components based on semiconductor materials arranged according to an anti-parallel or anti-series configuration to allow a control of bi-directional currents flowing along said second electric branch.

11. The switching apparatus according to claim 1, wherein said second electronic branch comprises a diode bridge operatively associated to said current limiting circuit to allow a control of bi-directional currents flowing along said second electric branch.

12. The switching apparatus according to claim 1, wherein said second electric branch comprises a diode bridge circuit operatively associated to said current limiting circuit and said current blocking circuit to allow a control of bi-directional currents.

13. The switching apparatus according to claim 1, wherein said first switching device of solid-state type is adapted to switch from an on-state to an off-state after a time interval has passed from an instant, in which a short-circuit current has been commuted from said first electric branch to said second electric branch.

14. The switching apparatus according to claim 1, wherein said first switching device of solid-state type is adapted to switch from an on-state to an off-state after a time interval has passed from an instant, in which an overload current or a normal current has been commuted from said first electric branch to said second electric branch.

15. The switching apparatus according to claim 1, wherein said second switching device of solid-state type is adapted to switch from an on-state to an off-state after a current has been commuted from said first electric branch to said second electric branch.

16. The switching apparatus according to claim 1, wherein said first electronic circuit of said current blocking circuit is configured to block the current circulating along the second electrical branch based on said switching apparatus operating in said open mode, and
wherein said second electronic circuit of said current limiting circuit is configured to limit the current based on said switching apparatus operating in said current limiting mode.

17. An electric grid comprising at least one switching apparatus, the at least one switching apparatus comprising:
first and second electric terminals for electrical connection with corresponding grid portions;
a first electric branch comprising one or more switching devices of electromechanical type, each having electric contacts that can be mechanically coupled or separated to conduct or block a current, respectively;
a second electric branch comprising a plurality of switching devices of solid-state type, each including one or more switching components based on semiconductor materials and being adapted to switch between an on-state, at which said switching device conducts a current, and an off-state, at which said switching device blocks a current, said second electric branch being electrically connected in parallel with said first electric branch between said first and second electric terminals;
wherein said second electric branch comprises:
a current blocking circuit adapted to block a current flowing along said second electric branch, said current blocking circuit including a first switching device of solid-state type and a first electronic circuit electrically connected in parallel to said first switching device of solid-state type;
a current limiting circuit adapted to limit a current flowing along said second electric branch, said current limiting circuit being electrically connected in series with said current blocking circuit and including a second switching device of solid-state type and a second electronic circuit electrically connected in parallel to said second switching device of solid-state type, and
wherein the at least one switching apparatus is configured to operate in a closed mode, an open mode based on using said first electronic circuit of said current blocking circuit, and a current limiting mode based on using said second electronic circuit of said current limiting circuit.

18. A switching group comprising a switching apparatus, the switching apparatus comprising:
first and second electric terminals for electrical connection with corresponding grid portions;
a first electric branch comprising one or more switching devices of electromechanical type, each having electric contacts that can be mechanically coupled or separated to conduct or block a current, respectively;
a second electric branch comprising a plurality of switching devices of solid-state type, each including one or more switching components based on semiconductor materials and being adapted to switch between an on-state, at which said switching device conducts a current, and an off-state, at which said switching device blocks a current, said second electric branch being electrically connected in parallel with said first electric branch between said first and second electric terminals;
wherein said second electric branch comprises:
a current blocking circuit adapted to block a current flowing along said second electric branch, said current blocking circuit including a first switching device of solid-state type and a first electronic circuit electrically connected in parallel to said first switching device of solid-state type;
a current limiting circuit adapted to limit a current flowing along said second electric branch, said current limiting circuit being electrically connected in series with said current blocking circuit and including a second switching device of solid-state type and a second electronic circuit electrically connected in parallel to said second switching device of solid-state type; and
a disconnector electrically connected in series with the first and second electric branches, and
wherein the switching apparatus is configured to operate in a closed mode, an open mode based on using said first electronic circuit of said current blocking circuit, and a current limiting mode based on using said second electronic circuit of said current limiting circuit.

* * * * *